United States Patent
Bond et al.

(10) Patent No.: US 12,526,003 B2
(45) Date of Patent: Jan. 13, 2026

(54) SYSTEMS AND METHODS FOR REMOVING VARIABLE DC OFFSET OF PERIODIC ANALOG SIGNALS

(71) Applicant: BATTELLE SAVANNAH RIVER ALLIANCE, LLC, Aiken, SC (US)

(72) Inventors: Colton M. Bond, Augusta, GA (US); Mitchell Scott Jordan, Aiken, SC (US)

(73) Assignee: Battelle Savannah River Alliance, LLC, Aiken, SC (US)

( * ) Notice: Subject to any disclaimer, the term of this patent is extended or adjusted under 35 U.S.C. 154(b) by 308 days.

(21) Appl. No.: 18/469,833

(22) Filed: Sep. 19, 2023

(65) Prior Publication Data
US 2025/0096832 A1    Mar. 20, 2025

(51) Int. Cl.
  *H04B 1/10*        (2006.01)
(52) U.S. Cl.
  CPC .................. *H04B 1/1036* (2013.01)
(58) Field of Classification Search
  CPC .................................................. H04B 1/1036
  See application file for complete search history.

(56) References Cited

U.S. PATENT DOCUMENTS

| | | | |
|---|---|---|---|
| 5,241,702 A | 8/1993 | Dent | |
| 6,327,313 B1 | 12/2001 | Traylor et al. | |
| 6,697,611 B1 * | 2/2004 | Franca-Neto | H04B 1/30 455/306 |
| 6,771,122 B2 | 8/2004 | Jin et al. | |
| 7,292,094 B2 | 11/2007 | Kwon | |
| 7,408,395 B2 | 8/2008 | Cao et al. | |
| 7,411,446 B2 | 8/2008 | Kao | |
| 7,782,137 B2 | 8/2010 | Tanaka | |
| 7,969,222 B2 | 6/2011 | Bouras | |
| 7,999,612 B2 | 8/2011 | Hseih | |
| 9,287,839 B1 | 3/2016 | Amadi et al. | |

(Continued)

FOREIGN PATENT DOCUMENTS

CN           111030610 A       4/2020

OTHER PUBLICATIONS

EEVblog Electronics Community Forum, "Variable DC offset Removal", posted Aug. 22, 2018, 6 pages.

(Continued)

*Primary Examiner* — Fayyaz Alam
(74) *Attorney, Agent, or Firm* — Dority & Manning, P.A.

(57) ABSTRACT

A signal processing system and method for removing a direct-current (DC) component from an analog input signal input is provided. The signal processing system includes an input transmission line, a first reference measurement circuit, a second reference measurement circuit, a bias detection circuit, and a bias removal circuit. The method includes determining, via the first reference measurement circuit, a first measured peak signal; determining, via the second reference measurement circuit, a second measured peak signal; determining, via the bias detection circuit, a bias signal indicative of the DC component of the analog input signal based at least in part on the first and second measured peak signals; and generating, via the bias removal circuit, an analog output signal based at least in part on the analog input signal and the bias signal. The analog output signal is the analog input signal with the DC component removed therefrom.

20 Claims, 23 Drawing Sheets

(56) References Cited

U.S. PATENT DOCUMENTS

| | | | |
|---|---|---|---|
| 10,224,910 | B1 | 3/2019 | Chang et al. |
| 11,190,889 | B2 | 11/2021 | Hashimoto |
| 2006/0227910 | A1 | 10/2006 | Ramasubramanian et al. |
| 2007/0030034 | A1* | 2/2007 | Kurtzman ............... G01R 19/04 327/58 |
| 2016/0142236 | A1* | 5/2016 | Nguyen ................. H04L 27/38 375/260 |
| 2022/0085779 | A1 | 3/2022 | Yamamoto |

OTHER PUBLICATIONS

Tang et al., "A DC-coupled Biomedical Radar Sensor with Analog DC Offset Calibration Circuit", IEEE Instrumentation and Measurement Society, 2018, 6 pages.

\* cited by examiner

SYSTEMS AND METHODS FOR REMOVING VARIABLE DC OFFSET OF PERIODIC ANALOG SIGNALS

FEDERAL RESEARCH STATEMENT

This invention was made with Government support under Contract No. 8930321CEM000080, awarded by the United States Department of Energy. The Government has certain rights in this invention.

FIELD

Example aspects of the present disclosure relate generally to signal processing systems and, more particularly, to systems and methods for removing a direct-current (DC) component from periodic analog signals.

BACKGROUND

Electrical signals are functions that carry information. Electrical signals may be combined through constructive interference and/or destructive interference. For instance, a periodic signal may be combined with a constant signal to form a periodic signal with a constant offset (e.g., a DC offset). In such instances, the periodic signal with the constant offset may be undesirable, and, in many situations, the same periodic signal without the constant offset may be desired. As such, conventional systems and methods for removing the constant offset (e.g., DC offset) exist. For instance, some systems and methods remove the DC offset using analog components, such as resistors and capacitors. Other systems and methods convert the periodic signal to a digital signal to perform modifications and then output a digitized version of the original periodic signal. However, in both cases, these conventional systems and methods produce undesirable signal distortions in the signal that is ultimately output.

SUMMARY

Aspects and advantages of embodiments of the present disclosure will be set forth in part in the following description, or can be learned from the description, or can be learned through practice of the embodiments.

One example aspect of the present disclosure is directed a method for removing a direct-current (DC) component from an analog input signal. The method may include determining, via a first reference measurement circuit of an analog processing system, a first measured peak signal based at least in part on the analog input signal. The method may further include determining, via a second reference measurement circuit of the analog signal processing system, a second measured peak signal based at least in part on the analog input signal. The method may further include, responsive to determining the first measured peak signal and the second measured peak signal, determining, via a bias detection circuit of the analog signal processing system, a bias signal based at least in part on the first measured peak signal and the second measured peak signal; the bias signal may be indicative of the DC component of the analog input signal. The method may further include generating, via a bias removal circuit of the analog signal processing system, an analog output signal based at least in part on the bias signal and the analog input signal; the analog output signal may be the analog input signal with the DC component removed therefrom.

Another example aspect of the present disclosure is directed to a signal processing system. The signal processing system may include an input transmission line, a first reference measurement circuit coupled to the input transmission line, a second reference measurement circuit coupled to the input transmission line, a bias detection circuit coupled to the first reference measurement circuit and the second reference measurement circuit, and a bias removal circuit coupled to the bias detection circuit and the input transmission line. The first reference measurement circuit, the second reference measurement circuit, the bias detection circuit, and the bias removal circuit may each include one or more analog components. Furthermore, the input transmission line may be operable to provide an analog input signal having a direct-current (DC) component and an alternating-current (AC) component to the signal processing system. The first reference measurement circuit may be configured to generate a first measured peak signal based at least in part on the analog input signal. The second reference measurement circuit configured to generate a second measured peak signal that is different from the first measured peak signal based at least in part on the analog input signal. The bias detection circuit may be configured to generate a bias signal based at least in part on the first measured peak signal and the second measured peak signal. The bias removal circuit may be configured to generate an analog output signal based at least in part on the bias signal and the analog input signal. The analog output signal may correspond to the analog input signal having the DC component removed therefrom.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1A:
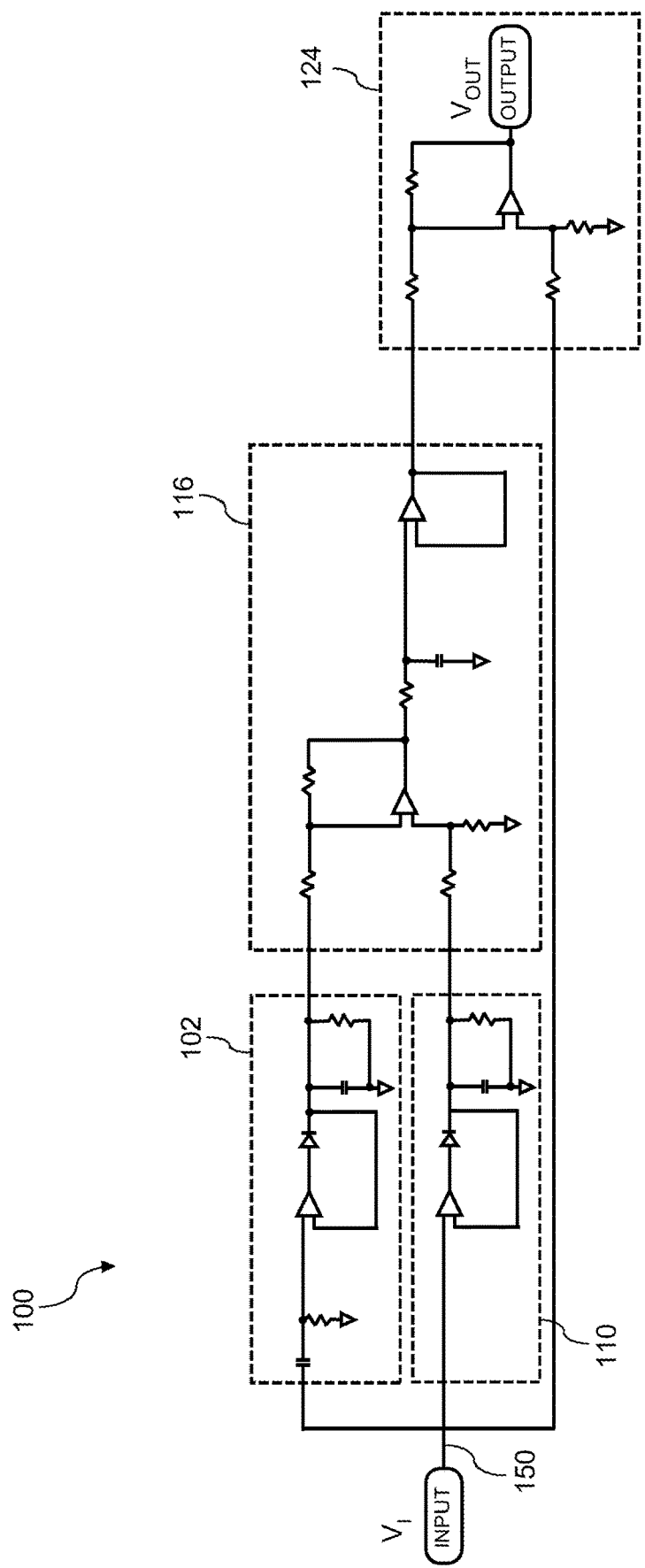
FIGS. 1A-1B depict an example signal processing system according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a signal processing system operable to remove variable direct-current (DC) components from signals in electrical systems, such as power transmission systems, audio recording equipment, and/or other electronic applications. In general, electrical signals are functions that carry information representative of a wide range of data, such as power transmission, audio signals, etc. Electrical signals often include a direct-current (DC) component and an alternating-current (AC) component. Additionally, some electrical signals are periodic signals, and other electrical signals are aperiodic signals. More specifically, periodic signals repeat after a given time (e.g., cycle) at a specified frequency (e.g., alternating current supplied to a load). Conversely, aperiodic signals do not repeat (e.g., Wi-Fi signals).

Electrical signals can be combined through constructive interference and/or destructive interference. More specifically, constructive interference occurs when the peaks (e.g., maxima) of two or more signals (e.g., in-phase signals) add together such that the amplitude of the resulting signal is equal to the sum of the individual amplitudes of the two or more signals. Conversely, destructive interference occurs when the maxima of two or more signals (e.g., out-of-phase signals) add together such that the amplitude of the resulting signal is zero.

One common example of combining signals occurs when a periodic signal (e.g., AC component) is combined with a constant signal (e.g., DC component) to form a periodic signal with a constant offset (e.g., bias). Depending on the application, this combination of the periodic signal with a constant offset (e.g., bias) may adversely affect the resulting output signal and lead to an undesirable output signal. In such situations, the same periodic signal with no offset (e.g., biased at zero) is desirable. By way of example, in audio recording applications, recording equipment often introduces unwanted DC components to signals. These unwanted DC components can lead to, e.g., audible clicks in the output signal, premature asymmetrical clipping, inaccurate meter readings, speaker damage, etc. Thus, systems and methods for removing DC components from signals are desirable.

However, conventional systems and methods for removing the unwanted DC component from a signal often adversely affect the remaining AC component. For instance, some signal processing systems utilize analog components (e.g., resistors, capacitors, etc.), which typically introduce a phase shift and/or a delay to the resulting output signal. Additionally, some signal processing systems utilize digital components to digitize the analog signal in order to perform complex mathematical signal processing to the digitized signal, which typically introduces latency to the resulting output signal. Furthermore, the digitized signal is a mere approximation of the analog input signal. Put differently, the digitized signal is not a true (e.g., accurate) representation of the analog input signal. Even further, some systems and methods require user input to train the system and/or tune the system.

Accordingly, example aspects of the present disclosure provide a signal processing system and method for adaptively removing a DC component (e.g., DC offset and/or bias) from an analog input signal without adversely affecting the remaining AC component. More specifically, a signal processing system of the present disclosure may include a single input transmission line that provides an analog input signal to the signal processing system. The input signal may be provided to a first reference measurement circuit that may remove a DC offset from the input signal and, subsequently, measure a peak (e.g., maxima) of the input signal with the DC offset removed therefrom. The input signal may also be provided to a second reference measurement circuit that may measure a peak (e.g., maxima) of the original input signal.

The signal processing system may further include a bias detection circuit that may receive the signals output by the first reference measurement circuit and the second reference measurement circuit, respectively. Based on these received signals, the bias detection circuit may determine the DC component of the original input signal that will ultimately be removed from the original analog input signal. The signal processing system may further include a bias removal circuit that may receive the original analog input signal and the signal output by the bias detection circuit. Based on these received signals, the bias removal circuit may remove the unwanted DC component from the original analog input signal. As such, the bias removal circuit may output an analog signal that includes the AC component of the original input signal but excludes the DC component original input signal.

It should be understood that the benefits described herein are described under ideal functionality. Those having ordinary skill in the art will appreciate that any physical circuit will produce some negligible signal distortions. As such, the aspects of present disclosure described herein are discussed in the context of the systems and methods operating under ideal functionality.

The signal processing system and methods disclosed herein may be implemented in a variety of applications across a variety of industries. By way of example, example aspects of the present disclosure may be implemented into integrated circuit (IC) chips for electronics manufacturers. Furthermore, the systems and methods disclosed herein may be useful in the industrial and/or automation sectors, where communication between devices having different DC offsets is critical. Even further, the systems and methods disclosed herein may be valuable for signal processing applications in the audio and/or video recording sectors, where conventional components routinely affect audio and/or video signals. It should be understood that the applications described above are for purposes of illustration and discussion. Aspects of the present disclosure are by no means limited to the above-described applications and/or fields. In fact, example aspects of the present disclosure may find application in any suitable industry and/or field without deviating from the scope of the present disclosure.

Aspects of the present disclosure provide a number of technical effects and benefits. For instance, example aspects of the present disclosure provide a system and method for removing the DC offset (e.g., constant and/or fluctuating, symmetric, asymmetric) from an analog input signal without adversely affecting the corresponding AC component. More specifically, systems and methods of the present disclosure do not introduce a phase shift or a delay to the resulting output signal. Furthermore, systems and methods of the present disclosure do not require user input, such as training or conditioning. Even further, systems and methods of the present disclosure do not require any digitization of the original analog input signal. Additionally, in contrast to conventional systems, systems of the present disclosure are operable over a single input line and, also, do not require an external clock, isolator, and/or memory.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1B:
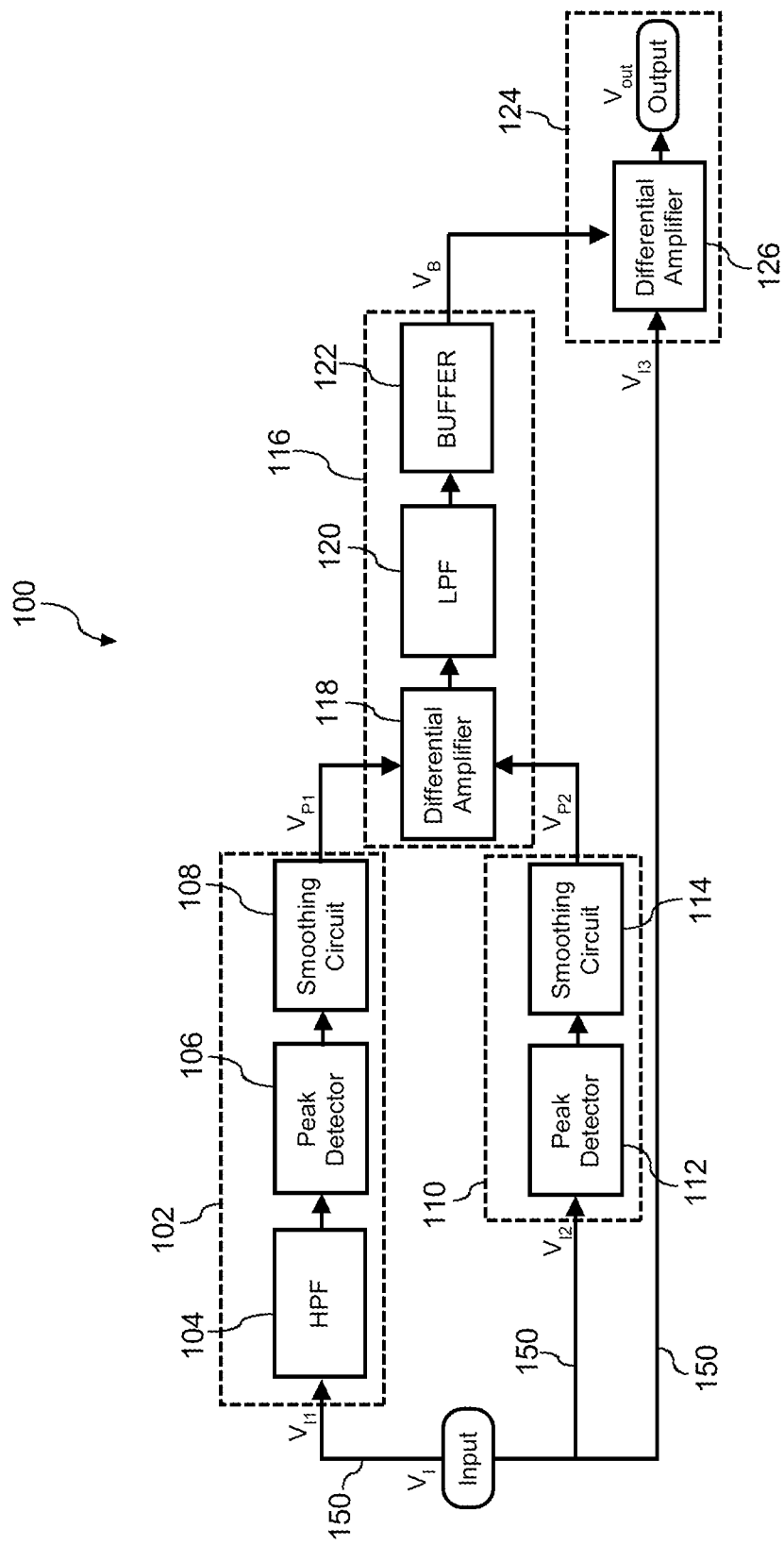

FIGS. 1A-1B depict an example signal processing system 100 according to example embodiments of the present disclosure. FIG. 1A depicts a circuit schematic of the example signal processing system 100, and FIG. 1B depicts a block diagram of the example signal processing system 100. As will be discussed in greater detail below, the system 100 may be configured to remove a direct-current (DC) component from an analog input signal without adversely affecting (e.g., distorting) the alternating-current (AC) component of the analog input signal. Furthermore, as used herein, "DC bias" and "DC offset" may be used interchangeably to refer to the DC component of the analog input signal. It should be understood that "DC bias," "DC offset," and/or "DC component" occurs when a mean amplitude of a signal is above (e.g., positive) and/or below (e.g., negative) a center axis.

Referring to FIGS. 1A-1B, the signal processing system 100 may include a plurality of analog circuit components configured to perform signal processing on the analog input signal. More specifically, as shown, the system 100 may include an input transmission line 150 operable to provide an analog input signal $V_I$ to various components of the signal processing system 100. As mentioned above, the analog input signal $V_I$ may include a direct-current (DC) component and an alternating-current (AC) component. Furthermore, in some embodiments, the analog input signal $V_I$ may be a symmetric waveform. Alternatively, in other embodiments, the analog input signal $V_I$ may be an asymmetric waveform. In this manner, the system 100 may remove a constant DC component and/or a fluctuating DC component from the analog input signal $V_I$, thereby generating (e.g., outputting) an analog output signal $V_{OUT}$ corresponding to the analog input signal $V_I$ having the constant DC component and/or fluctuating DC component removed therefrom.

As shown, the system 100 may include a first reference measurement circuit 102 (discussed in greater detail below with reference to FIGS. 2A-5B). The first reference measurement circuit 102 may include a high-pass filter (HPF) 104 (FIGS. 3A-3B), a peak detector 106 (FIGS. 4A-4B), and a smoothing circuit 108 (FIGS. 5A-5B). The first reference measurement circuit 102 may be configured to receive the analog input signal (represented by $V_{I1}$) from the input transmission line 150 and output a first measured peak signal (represented by $V_{P1}$).

The system 100 may further include a second reference measurement circuit 110 (discussed in greater detail below with reference to FIGS. 6A-8). Similar to the first reference measurement circuit 102, the second reference measurement circuit 110 may include a peak detector 112 (FIG. 7) and a smoothing circuit 114 (FIG. 8). The second reference measurement circuit 110 may be configured to receive the analog input signal (represented by $V_{I2}$) from the input transmission line 150 and output a second measured peak signal (represented by $V_{P2}$).

The system 100 may further include a bias detection circuit 116 (discussed in greater detail below with reference to FIGS. 9A-12B). The bias detection circuit 116 may include a first differential amplifier 118 (FIGS. 10A-10B), a low-pass filter (LPF) 120 (FIGS. 11A-11B), and a buffer 122 (FIGS. 12A-12B). The bias detection circuit 116 may be configured to receive the first measured peak signal $V_{P1}$ from the first reference measurement circuit 102 and the second measured peak signal $V_{P2}$ from the second reference measurement circuit 110. Furthermore, the bias detection circuit 116 may be configured to output a bias signal (represented by $V_B$).

Figure 13A:
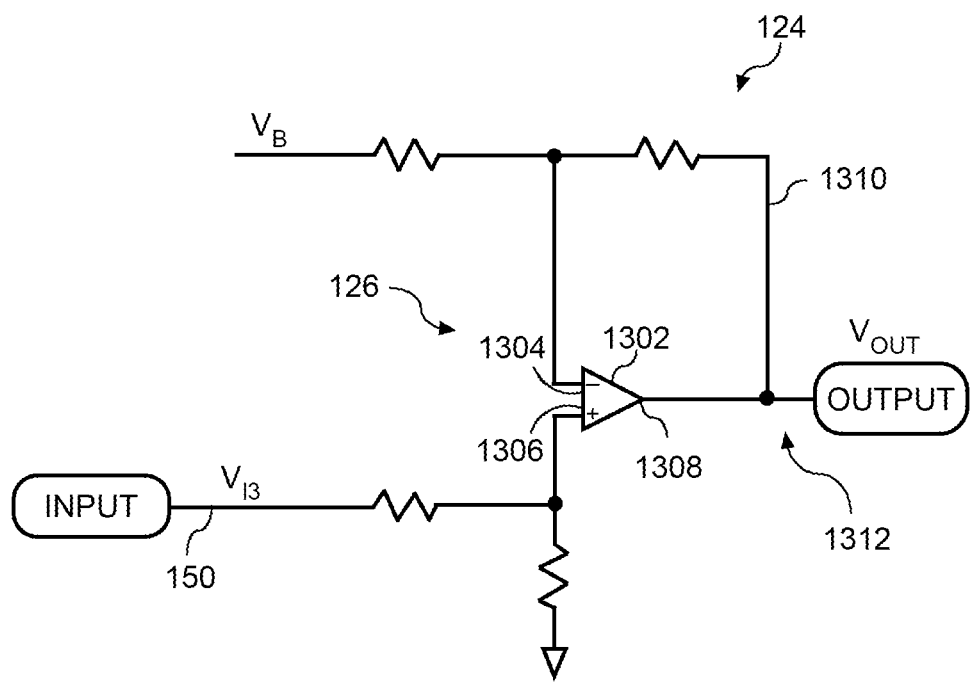
FIGS. 13A-13B depict an example bias removal circuit according to example embodiments of the present disclosure.
Figure 13B:
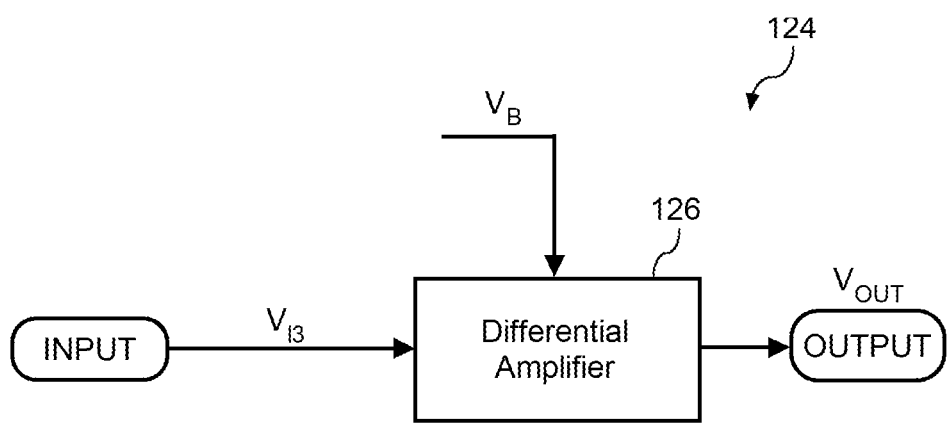

The system 100 may further include a bias removal circuit 124 (discussed in greater detail below with reference to FIGS. 13A-13B). The bias removal circuit 124 may include a second differential amplifier 126 (FIGS. 13A-13B). The bias removal circuit 124 may be configured to receive the analog input signal (represented by $V_{I3}$) from the input transmission line 150 and the bias signal $V_B$ from the bias detection circuit 116. Furthermore, the bias removal circuit 124 may be configured to output an analog output signal (represented by $V_{OUT}$). The analog output signal $V_{OUT}$ corresponds to the analog input signal $V_I$ with the DC component (e.g., $V_B$) removed therefrom.

It should be noted that—although represented by $V_{I1}$, $V_{I2}$, and $V_{I3}$—the input signal to the first reference measurement circuit 102, the second reference measurement circuit 110, and the bias removal circuit 124 are the same analog input signal $V_I$.

Furthermore, as may be seen in FIGS. 1A-1B, the system 100 includes a plurality of analog components. In this manner, the system 100 is configured to remove the DC component (e.g., $V_B$) from the analog input signal $V_I$ without digitizing the analog input signal $V_I$. As will be discussed in greater detail below, the analog input signal $V_I$ may be a symmetric waveform or an asymmetric waveform without affecting the operation of the system 100. As used herein, a "symmetric waveform" refers to an input signal that is symmetric about the x-axis, and an "asymmetric waveform" refers to an input signal that is asymmetric about the x-axis.

In some instances, the analog input signal $V_I$ may include a constant DC component. In such instances, the system 100 may remove the constant DC component from the analog input signal $V_I$. Additionally and/or alternatively, the analog input signal $V_I$ may include a fluctuating (e.g., changing) DC component. In such instances, as will be discussed in greater detail below, the system 100 may adapt to the fluctuating DC component and may remove the fluctuating DC component from the analog input signal $V_I$. Moreover, in contrast to conventional systems, the system 100 is configured to remove the DC component from the analog input signal $V_I$ without affecting the AC component of the analog input signal $V_I$. In fact, as will be discussed in greater detail below, the system 100 is designed such that no phase shift and/or delay is introduced to the analog output signal $V_{OUT}$ under ideal circuit functionality. Those having ordinary skill in the art will understand that some amount of negligible phase shift and/or latency will be introduced by any physical circuit.

Furthermore, as may be seen in FIGS. 1A-1B, the system 100 is designed to operate without a variety of components routinely included in conventional systems. For instance, the system 100 is configured to operate without an external clock and/or isolator. The system 100 is likewise configured to operate without an external memory. Moreover, the system 100 may operate without any prior training and/or conditioning and may also operate without operator (e.g., user) input.

Figure 2A:
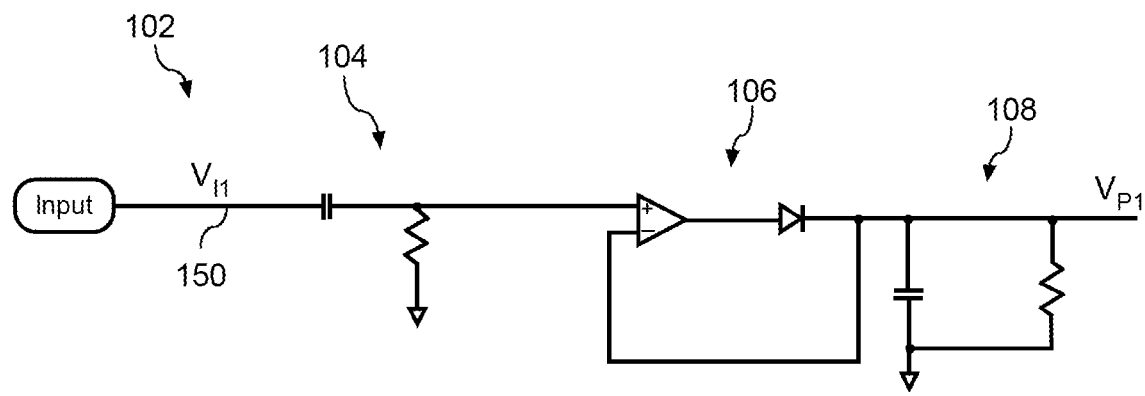
FIGS. 2A-2B depict an example reference measurement circuit according to example embodiments of the present disclosure.
Figure 2B:
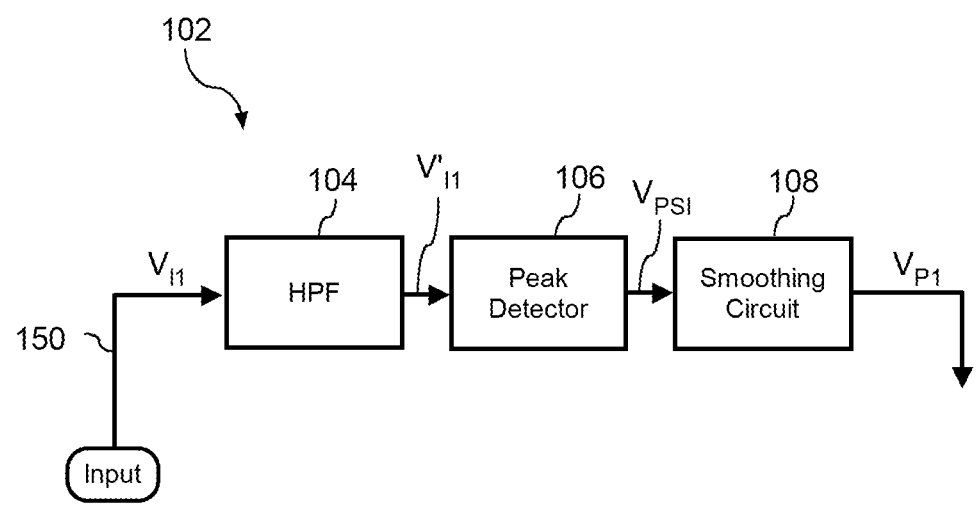

Referring now to FIGS. 2A-2B, an example reference measurement circuit (e.g., first reference measurement circuit 102) is depicted. FIG. 2A depicts a circuit schematic of the reference measurement circuit 102, and FIG. 2B depicts a block diagram of the reference measurement circuit 102. As noted above, the reference measurement circuit 102 may include an HPF 104, a peak detector 106, and a smoothing circuit 108. Furthermore, the reference measurement circuit 102 may be configured to receive the analog input signal $V_{I1}$ from the input transmission line 150, and the reference measurement circuit 102 may be further configured to output the first measured peak signal $V_{P1}$. More particularly, as will be discussed in greater detail below, the reference measurement circuit 102 may be configured to generate the first measured peak signal $V_{P1}$ based at least in part on the analog input signal $V_{I1}$ received from the input transmission line 150.

As shown, reference measurement circuit 102 may be coupled to the input transmission line 150. More particularly, the input transmission line 150 may be coupled to an input of the HPF 104. Furthermore, an output of the HPF 104 may be coupled to an input of the peak detector 106. Even further, an output of the peak detector 106 may be coupled to an input of the smoothing circuit 108.

Figure 3A:
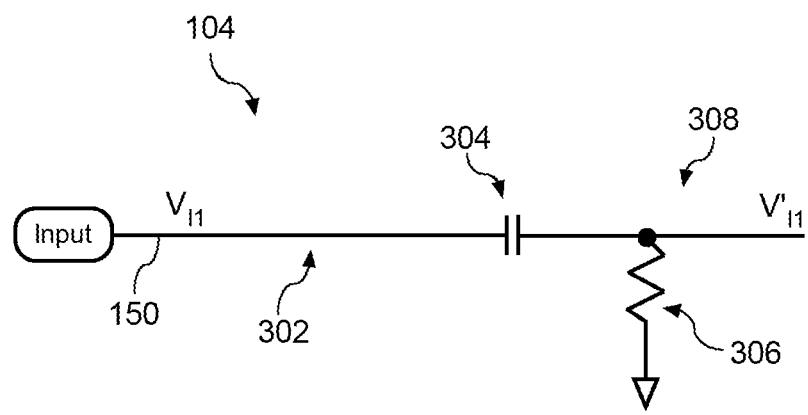
FIGS. 3A-3B depict an example high-pass filter (HPF) of the example reference measurement circuit of FIGS. 2A-2B according to example embodiments of the present disclosure.
Figure 3B:
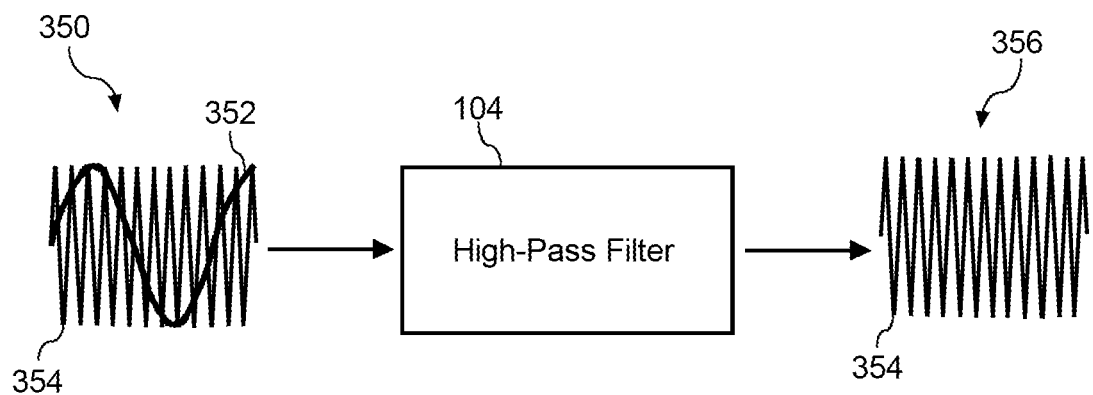

An example high-pass filter (HPF) 104 is depicted in FIGS. 3A-3B. FIG. 3A depicts a circuit schematic of the example HPF 104, and FIG. 3B depicts a functional diagram of the HPF 104. In some embodiments, the HPF 104 may be a passible high-pass filter. Furthermore, the HPF 104 may include a plurality of analog components. For instance, as shown in FIG. 3A, the HPF 104 includes an input 302 coupled to the input transmission line 150 over which the HPF 104 may receive the analog input signal $V_{f1}$. The HPF 104 may include a capacitor 304 coupled to the input 302. The HPF 104 may further include a resistor 306 coupled between an output of the capacitor 304 and ground. For instance, in some embodiments, the HPF 104 may operate as a DC blocking capacitor. It should be understood that any suitable high-pass filter having any suitable configuration of components may be used without deviating from the scope of the present disclosure.

HPF 104 may be configured to remove signal components of the received analog input signal $V_{f1}$ that fall below a threshold frequency (hereinafter referred to as "HPF frequency threshold"). For instance, referring to FIG. 3B, HPF 104 may receive an input signal 350. Input signal 350 may include a low-frequency component 352 that is below the HPF frequency threshold and a high-frequency component 354 that is above the HPF frequency threshold. In such instances, HPF 104 may receive the input signal 350 and filter out components of input signal 350 that fall below the HPF frequency threshold (e.g., low-frequency component 352). In this manner, HPF 104 may output a modified signal 356 that includes the high-frequency component 354, but excludes the low-frequency component 352, of input signal 350. It should be understood that the signals depicted in FIG. 3B are for purposes of illustration and discussion.

In this way, referring again to FIG. 3A, HPF 104 may receive the analog input signal $V_{f1}$ and generate (e.g., output) a modified input signal $V'_{f1}$. As described above, the modified input signal $V'_{f1}$ output by HPF 104 may include components of the analog input signal $V_{f1}$ above the HPF frequency threshold but may exclude components of the analog input signal $V_{f1}$ that fall below the HPF frequency threshold. Furthermore, the portion of the analog input signal $V_{f1}$ that is removed by the HPF 104 may correspond to the unwanted DC offset of the analog input signal $V_{f1}$. Passive analog HPF filters impose an undesirable phase shift between a current component (not shown) and a voltage component (not shown) of the modified input signal $V'_{f1}$. As noted above, a distortion to the output signal (with respect to the input signal), such as a phase shift, is typically an adverse consequence of conventional DC offset removal systems. However, as will be described below with reference to FIGS. 4A-4B, systems and methods of the present disclosure render these signal distortions acceptable. In particular, these signal distortions are acceptable because an output 308 of HPF 104 may be coupled to the peak detector 106.

Figure 4A:
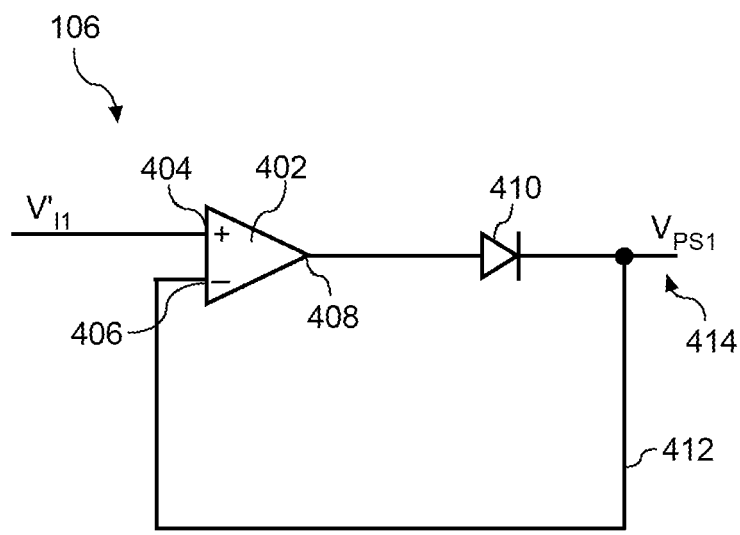
FIGS. 4A-4B depict an example peak detector of the example reference measurement circuit of FIGS. 2A-2B according to example embodiments of the present disclosure.
Figure 4B:
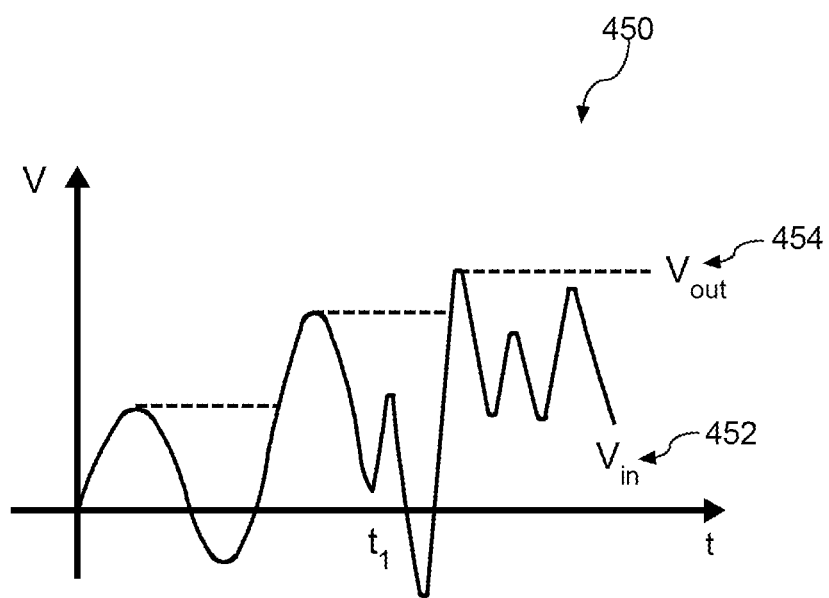
Figure 5A:
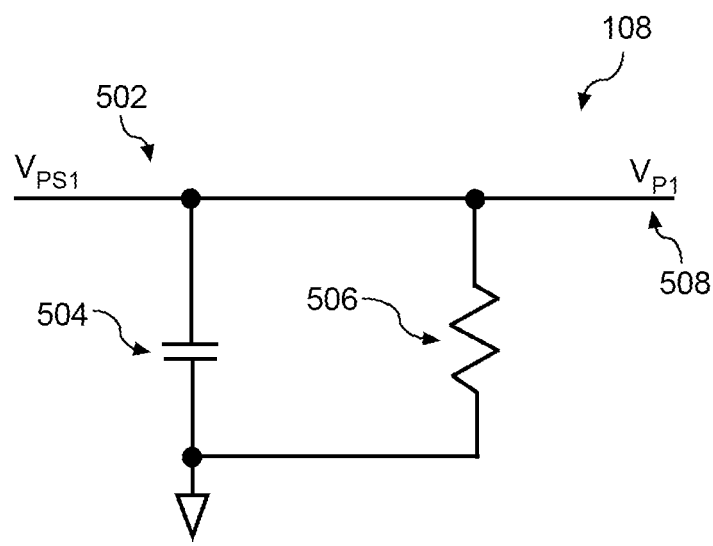
FIGS. 5A-5B depict an example smoothing circuit of the example reference measurement circuit of FIGS. 2A-2B according to example embodiments of the present disclosure.
Figure 5B:
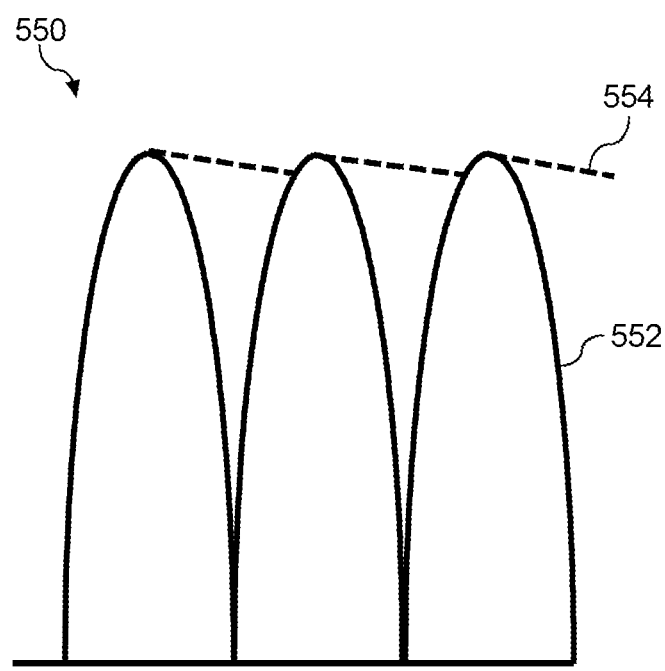

An example peak detector 106 is depicted in FIGS. 4A-4B. FIG. 4A depicts a circuit schematic of the example peak detector 106, and FIG. 4B depicts a time-aligned chart 450 showing a relationship between input and output signals of the peak detector 106. The example peak detector 106 may include a plurality of analog components. For instance, as shown in FIG. 4A, the peak detector 106 may include an operational amplifier 402 having a first input 404 (e.g., positive terminal) and a second input 406 (e.g., negative terminal). The first input 404 may be coupled to the output 308 of HPF 104 (FIGS. 3A-3B). In this way, the peak detector 106 may be receive the modified input signal $V'_{f1}$ from the HPF 104. Furthermore, the operational amplifier 402 may include an output 408 coupled to a diode 410. The peak detector 106 may further include a feedback loop 412 coupled to the second input 406 of the operational amplifier 402. It should be understood that any suitable reference measurement circuit having any suitable configuration of components may be used without deviating from the scope of the present disclosure.

As noted above, the modified input signal $V'_{f1}$ may include distortions (e.g., a phase shift) as a result of the signal processing performed by the HPF 104. However, peak detector 106 is configured to measure a peak (e.g., maxima) of the received modified input signal $V'_{f1}$. As such, these distortions caused by the HPF 104 are acceptable. More specifically, as shown in chart 450 of FIG. 4B, peak detector 106 may receive a distorted input signal 452. Because peak detector 106 measures the peaks (e.g., maxima) of the distorted input signal 452, the output signal 454 is unaffected by the distortions. Put differently, the distortions in input signal 452 do not affect the output signal 454 because the peaks (e.g., maxima) of the input signal 452 are independent from the distortions.

In this way, referring again to FIG. 4A, peak detector 106 may receive the modified input signal $V'_{f1}$ from the HPF 104 and generate (e.g., output) a first peak signal $V_{PS1}$. As described above, the first peak signal $V_{PS1}$ may correspond to the signal peaks in modified input signal $V'_{f1}$ as measured by the peak detector 106. Similar to the HPF 104 and modified output signal $V'_{f1}$, the first peak signal $V_{PS1}$ may include undesirable distortions. For instance, the first peak signal $V_{PS1}$ may include one or more signal infirmities such as, e.g., ripples, as a result of the signal processing performed by the peak detector 106. However, as will be described below with reference to FIGS. 5A-5B, systems and methods of the present disclosure render these signal infirmities acceptable. In particular, these signal infirmities are acceptable because an output 414 of peak detector 106 may be coupled to the smoothing circuit 108.

An example smoothing circuit 108 is depicted in FIGS. 5A-5B. FIG. 5A depicts a circuit schematic of the example smoothing circuit 108, and FIG. 5B depicts a time-aligned chart 550 illustrating operation of the smoothing circuit 108. The smoothing circuit 108 may include a plurality of analog components. For instance, as shown in FIG. 5A, the smoothing circuit 108 may include an input 502 coupled to the output 414 of the peak detector 106 (FIGS. 4A-4B). In this way, the smoothing circuit 108 may receive the first peak signal $V_{PS1}$ from the peak detector 106. In some embodiments, the smoothing circuit 108 may include a capacitor 504 and a resistor 506, in a parallel arrangement, coupled to the input 502 of the smoothing circuit 108. It should be understood that any suitable smoothing circuit having any suitable configuration of components may be used without deviating from the scope of the present disclosure.

As noted above, the first peak signal $V_{PS1}$ may include one or more signal infirmities (e.g., ripples) as a result of the signal processing performed by the peak detector 106. However, smoothing circuit 108 is configured to cure those signal infirmities by, e.g., smoothing the ripples in the first peak signal $V_{PS1}$. As such, these signal infirmities caused by the peak detector 106 are acceptable. More specifically, as shown in chart 550 of FIG. 5B, smoothing circuit 108 may receive an input signal 552 having one or more signal infirmities (e.g., ripples). Because the smoothing circuit 108 smooths those ripples, the output signal 554 is substantially unaffected by the infirmities. As such, smoothing circuit 108 is configured to generate a smoother output signal 554 with respect to the input signal 552.

In this way, referring again to FIG. 5A, smoothing circuit 108 may receive the first peak signal $V_{PS1}$ from the peak detector 106 and generate (e.g., output) a first measured peak signal $V_{P1}$. As described above, the first measured peak signal $V_{P1}$ may correspond to the first peak signal $V_{PS1}$ having the one or more signal infirmities (produced by the peak detector 106) substantially removed therefrom. As will be discussed in greater detail below, an output 508 of the smoothing circuit 108 may be coupled to an input of the bias detection circuit 116. More specifically, the smoothing circuit 108 may provide the first measured peak signal $V_{P1}$ to bias detection circuit 116 for further signal processing.

Figure 6A:
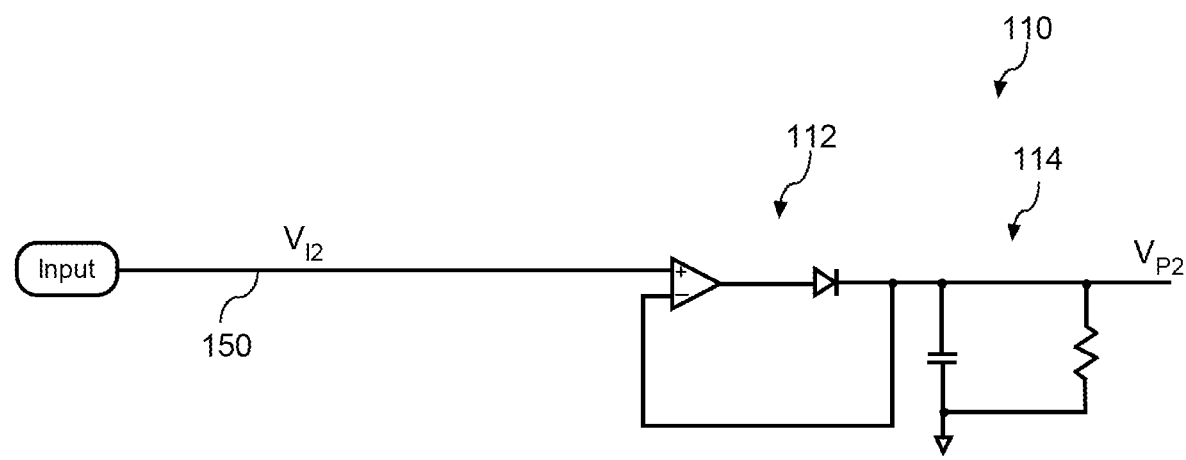
FIGS. 6A-6B depict an example reference measurement circuit according to example embodiments of the present disclosure.
Figure 6B:
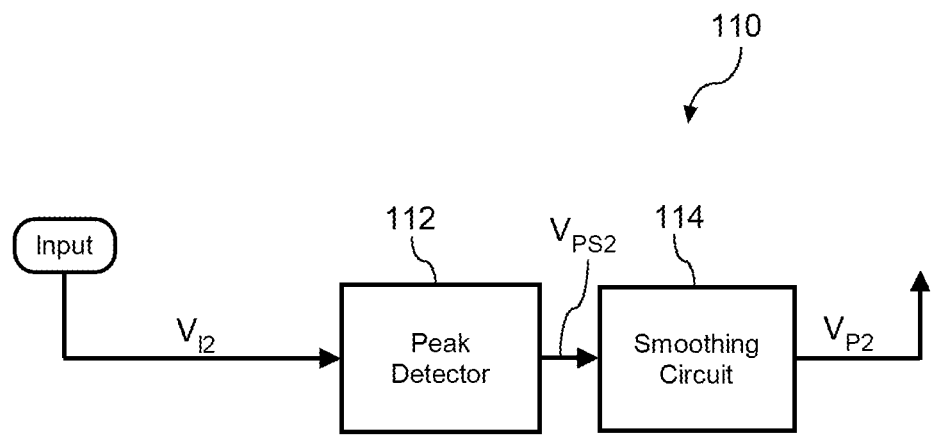

Referring now to FIGS. 6A-6B, an example reference measurement circuit (e.g., second reference measurement circuit 110) is depicted. FIG. 6A depicts a circuit schematic of the reference measurement circuit 110, and FIG. 6B depicts a block diagram of the reference measurement circuit 110. As noted above, the reference measurement circuit 110 may include a peak detector 112 and a smoothing circuit 114. Furthermore, the reference measurement circuit 110 may be configured to receive the analog input signal $V_{I2}$ from the input transmission line 150, and the reference measurement circuit 110 may be further configured to output the second measured peak signal $V_{P2}$. More particularly, as will be discussed in greater detail below, the reference measurement circuit 110 may be configured to generate the second measured peak signal $V_{P2}$ based at least in part on the analog input signal $V_{I2}$ received from the input transmission line 150. It should be understood that the second measured peak signal $V_{P2}$ generated by the reference measurement circuit 110 is different from the first measured peak signal $V_{P1}$ generated by the reference measurement circuit 102.

As shown, reference measurement circuit 110 may be coupled to the input transmission line 150. More particularly, the input transmission line 150 may be coupled to an input of the peak detector 112. Furthermore, an output of the peak detector 112 may be coupled to an input of the smoothing circuit 114.

Figure 7:
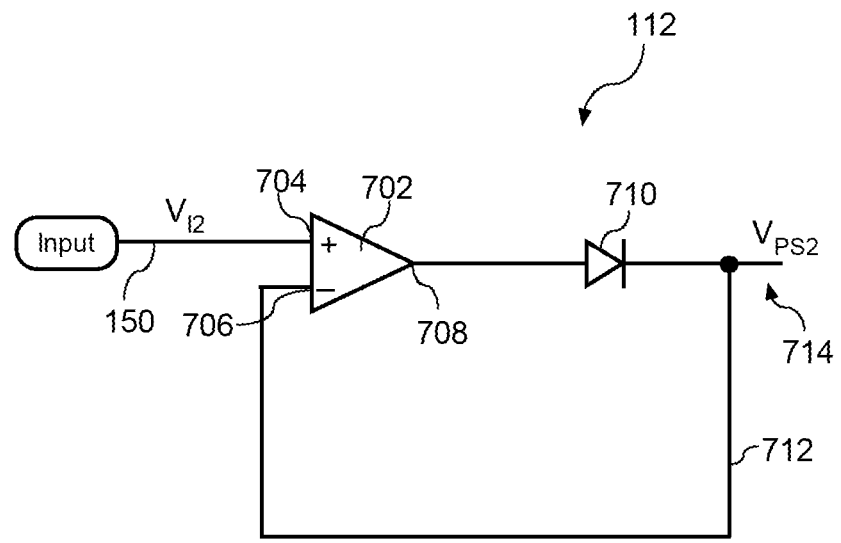
FIG. 7 depicts an example peak detector of the example reference measurement circuit of FIGS. 6A-6B according to example embodiments of the present disclosure.
Figure 8:
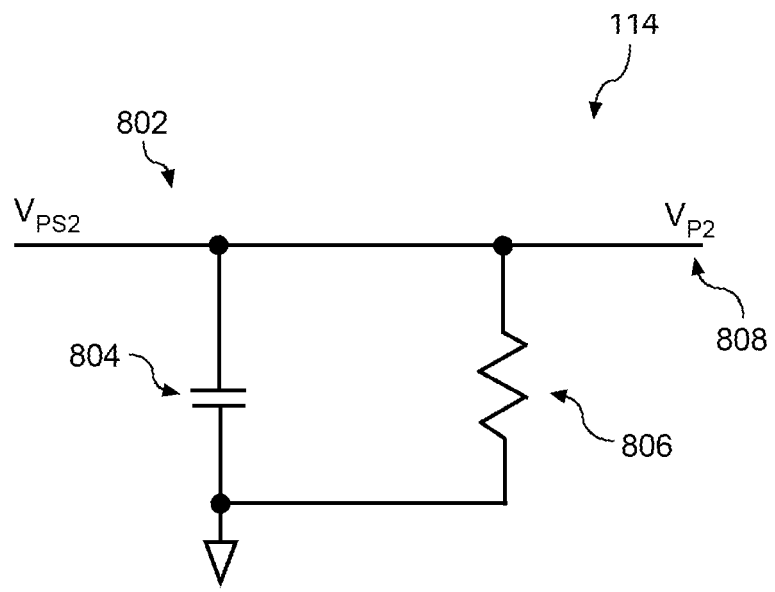
FIG. 8 depicts an example smoothing circuit of the example reference measurement circuit of FIGS. 6A-6B according to example embodiments of the present disclosure.

An example peak detector 112 of the reference measurement circuit 110 is depicted in FIG. 7. Similar to the peak detector 106 described above with reference to the first reference measurement circuit 102, the peak detector 112 may include a plurality of analog components. For instance, the peak detector 112 may include an operational amplifier 702 having a first input 704 (e.g., positive terminal) and a second input 706 (e.g., negative terminal). The first input 704 may be coupled to the input transmission line 150. In this way, peak detector 112 may be configured to receive the analog input signal $V_{I2}$ over the input transmission line 150. It should be understood that the analog input signal $V_{I2}$ is the same signal as analog input signal $V_{I1}$. Furthermore, the operational amplifier 702 may include an output 708 coupled to a diode 710. The peak detector 112 may further include a feedback loop 712 coupled to the second input 706 of the operational amplifier 702. It should be understood that any suitable reference measurement circuit having any suitable configuration of components may be used without deviating from the scope of the present disclosure.

The peak detector 112 may function in the same manner as peak detector 106 of the first reference measurement circuit 102. More specifically, peak detector 112 may receive the analog input signal $V_{I2}$ over the input transmission line 150 and generate (e.g., output) a second peak signal $V_{PS2}$. The second peak signal $V_{PS2}$ may correspond to the signal peaks in the analog input signal $V_{I2}$ as measured by the peak detector 112. Furthermore, the second peak signal $V_{PS2}$ may include the same signal infirmities as described above with reference to the first peak signal $V_{PS1}$. For those reasons, as will be described below with reference to FIG. 8, these signal infirmities in the second peak signal $V_{PS2}$ are acceptable because an output 714 of peak detector 112 may be coupled to the smoothing circuit 114.

An example smoothing circuit 114 of the reference measurement circuit 110 is depicted in FIG. 8. Similar to the smoothing circuit 108 described above with reference to the first reference measurement circuit 102, the smoothing circuit 114 may include a plurality of analog components. For instance, the smoothing circuit 114 may include an input 802 coupled to the output 714 of the peak detector 112 (FIG. 7). In this way, the smoothing circuit 114 may be configured to receive the second peak signal $V_{PS2}$ from the peak detector 112. Furthermore, the smoothing circuit 114 may include similar components to those described above with reference to the smoothing circuit 108. More particularly, the smoothing circuit 114 may include a capacitor 804 and a resistor 806, in a parallel arrangement, coupled to the input 802 of the smoothing circuit 114. It should be understood that any suitable smoothing circuit having any suitable configuration of components may be used without deviating from the scope of the present disclosure.

The smoothing circuit 114 may function in the same manner as peak detector 106 of the first reference measurement circuit 102. More particularly, smoothing circuit 114 may receive the second peak signal $V_{PS2}$ from the peak detector 112 and generate (e.g., output) a second measured peak signal $V_{P2}$. As described above, the second measured peak signal $V_{P2}$ may correspond to the second peak signal $V_{PS2}$ having the one or more signal infirmities (produced by the peak detector 112) substantially removed therefrom. Furthermore, as will be discussed in greater detail below, an output 808 of the smoothing circuit 114 may be coupled to an input of the bias detection circuit 116. More specifically, the smoothing circuit 114 may provide the second measured peak signal $V_{P2}$ to bias detection circuit 116 for further signal processing. It should be appreciated that the second measured peak signal $V_{P2}$ is a different signal from the first measured peak signal $V_{P1}$.

Figure 9A:
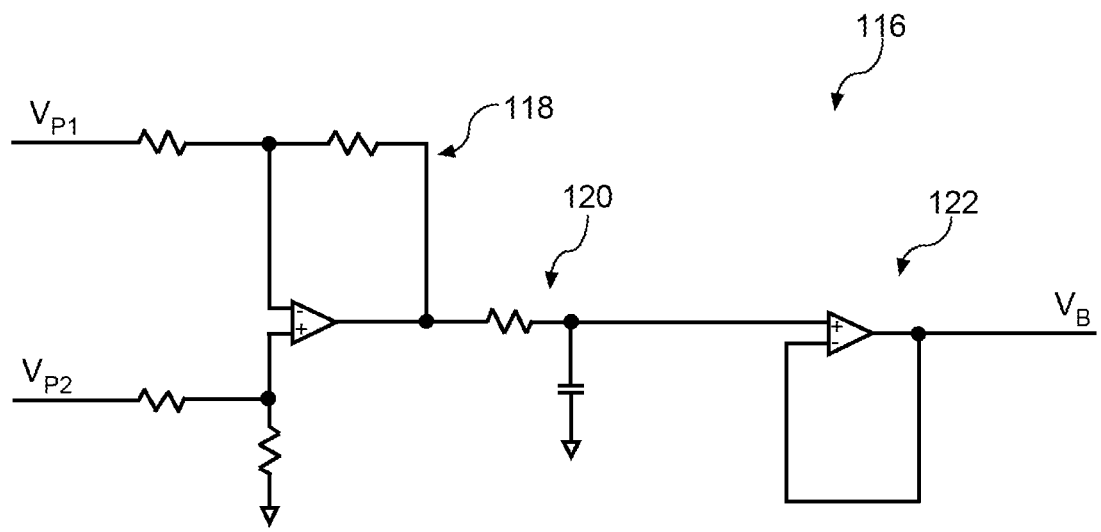
FIGS. 9A-9B depict an example bias detection circuit according to example embodiments of the present disclosure.
Figure 9B:
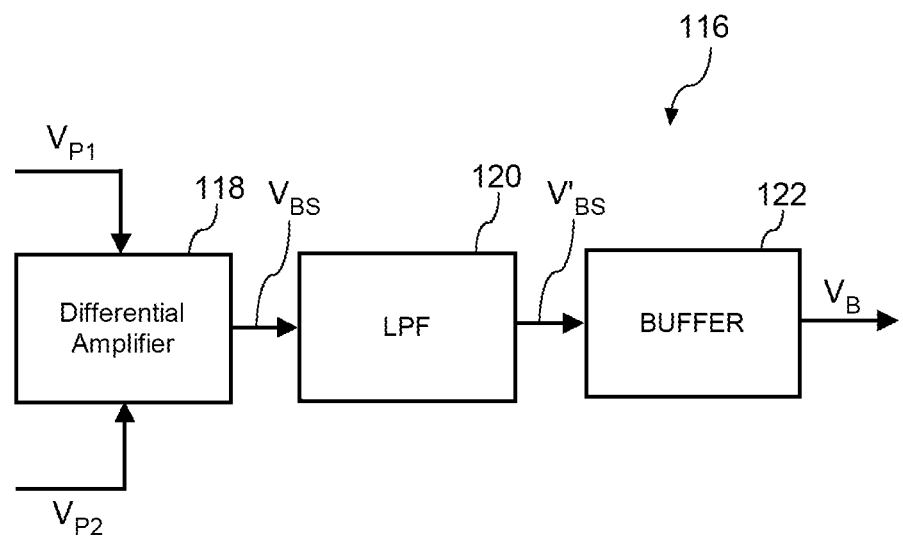

Referring now to FIGS. 9A-9B, an example bias detection circuit 116 is depicted. FIG. 9A depicts a circuit schematic of the bias detection circuit 116, and FIG. 9B depicts a block diagram of the bias detection circuit 116. As noted above, the bias detection circuit 116 may include a first differential amplifier 118, an LPF 120, and a buffer 122. Furthermore, the bias detection circuit 116 may be configured to receive the first measured peak signal $V_{P1}$ from the first reference measurement circuit 102 and the second measured peak signal $V_{P2}$ from the second reference measurement circuit 110, and the bias detection circuit 116 may be further configured to output the bias signal $V_B$. More particularly, as will be discussed in greater detail below, the bias detection circuit 116 may be configured to generate the bias signal $V_B$ based at least in part on the first measured peak signal $V_{P1}$ generated by the first reference measurement circuit 102 and the second measured peak signal $V_{P2}$ generated by the second reference measurement circuit 110.

Figure 10A:
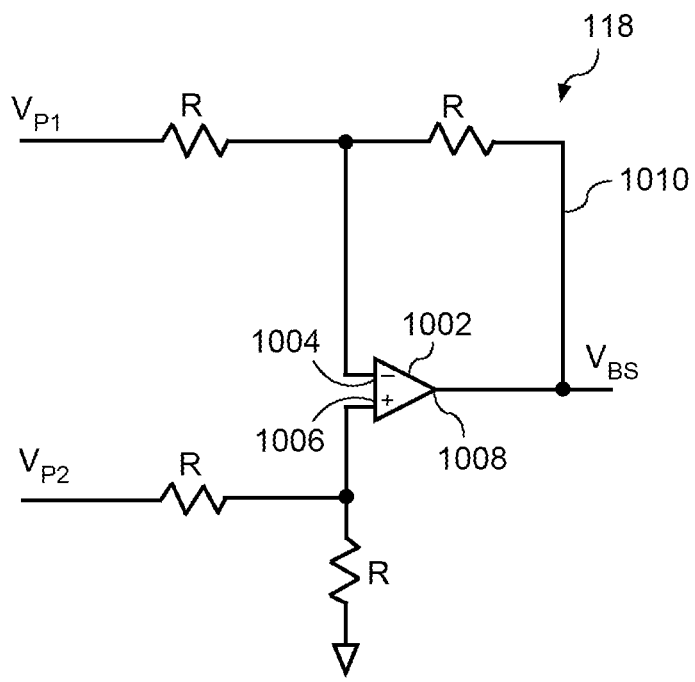
FIGS. 10A-10B depict an example differential amplifier of the example bias detection circuit of FIGS. 9A-9B according to example embodiments of the present disclosure.

Bias detection circuit 116 may be coupled to an output of the first reference measurement circuit 102 and to an output of the second reference measurement circuit 110. More particularly, the output of the first reference measurement circuit 102 may be coupled to a first input 1004 of the first differential amplifier 118 (FIG. 10A). The output of the second reference measurement circuit 110 may be coupled to a second input 1006 of the first differential amplifier 118 (FIG. 10A). An output 1008 of the first differential amplifier 118 (FIG. 10A) may be coupled to an input 1102 of the LPF 120 (FIG. 11A), and an output 1108 of the LPF 120 (FIG. 11A) may be coupled to an input 1204 of the buffer 122 (FIG. 12A).

Figure 10B:
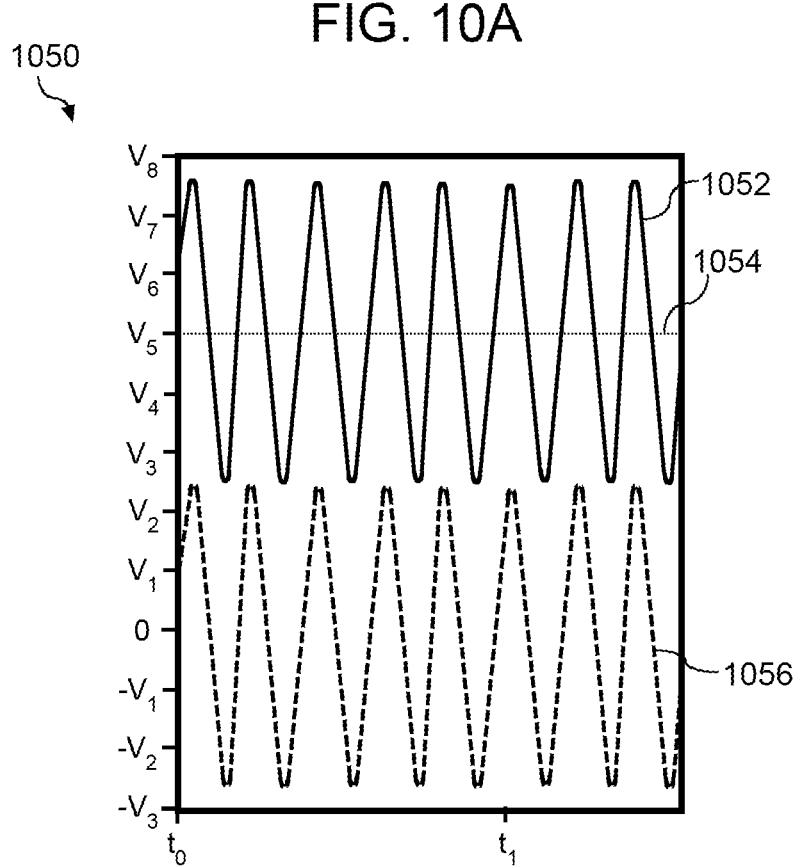

An example differential amplifier 118 of the bias detection circuit 116 is depicted in FIGS. 10A-10B. FIG. 10A depicts a circuit schematic of the example differential amplifier 118, and FIG. 10B depicts time-aligned charts 1050 illustrating operation of the differential amplifier 118. The example differential amplifier 118 may include a plurality of analog components. For instance, as shown in FIG. 10A, the differential amplifier 118 may include an operational amplifier 1002 having a first input 1004 (e.g., negative terminal) and a second input 1006 (e.g., positive terminal). The first input 1004 may be coupled to an output of the first reference measurement circuit 102, and the second input 1006 may be coupled to an output of the second reference measurement circuit 110. More specifically, the first input 1004 may be coupled to the output 508 of the smoothing circuit 108, and the second input 1006 may be coupled to the output 708 of the smoothing circuit 114. In this way, the differential amplifier 118 may be configured to receive the first measured peak signal $V_{P1}$ from the first reference measurement circuit 102 at the first input 1004 and the second measured peak signal $V_{P2}$ from the second reference measurement circuit 110 at the second input 1006.

The differential amplifier 118 may include an output 1008 and a feedback loop 1010 coupled thereto. The differential amplifier 118 may further include one or more resistors R configured to control a voltage gain of the differential amplifier 118. It should be understood that any suitable resistors having any suitable resistance value(s) may be used without deviating from the scope of the present disclosure. It should be further understood that any suitable differential amplifier having any suitable configuration of components may also be used without deviating from the scope of the present disclosure.

In some embodiments, such as that depicted in FIG. 10A, the differential amplifier 118 may be a closed-loop differential amplifier. Closed-loop differential amplifiers (e.g., differential amplifier 118) are configured to determine a difference between the signals (e.g., $V_{P1}$, $V_{P2}$) input at the first and second inputs (e.g., first input 1004, second input 1006), respectively. For instance, as shown in chart 1050 of FIG. 10B, an example closed-loop differential amplifier (e.g., differential amplifier 118) may determine a difference between a first input signal 1052 and a second input signal 1054. As noted above, the first input signal 1052 may be input to the example closed-loop differential amplifier at a first input (e.g., first input 1004), and the second input signal 1054 may be input to the example closed-loop differential amplifier at a second input (e.g., second input 1006). In this manner, the example closed-loop differential amplifier may determine a difference between the signals 1052, 1054 and output an output signal 1056 corresponding to the determined difference. As shown in the example depicted in FIG. 10B, the output signal 1056 corresponds to the first input signal 1052 having the second input signal 1054 subtracted therefrom.

In this way, referring again to FIG. 10A, differential amplifier 118 may receive the first measured peak signal $V_{P1}$ from the first reference measurement circuit 102 at the first input 1004 and the second measured peak signal $V_{P2}$ from the second reference measurement circuit 110 at the second input 1006. Furthermore, as described above, differential amplifier 118 may generate (e.g., output) a bias error signal $V_{BS}$ indicative of a bias error (e.g., difference) between the first measured peak signal $V_{P1}$ and the second measured peak signal $V_{P2}$. As such, the bias error signal $V_{BS}$ may be related to the first measured peak signal $V_{P1}$ and the second measured peak signal $V_{P2}$. The bias error signal $V_{BS}$ may be represented by the equation:

$$V_{BS} = V_{P2} - V_{P1}$$

As noted above, the first measured peak signal $V_{P1}$ output by the first reference measurement circuit 102 corresponds to the signal peaks of the modified input signal $V'_{I1}$, which corresponds to the analog input signal $V_I$ having the DC offset removed therefrom. Likewise, the second measured peak signal $V_{P2}$ output by the second reference measurement circuit 110 corresponds to the signal peaks of the input signal $V_{I2}$, which corresponds to the analog input signal $V_I$ in its original form. As such, by determining a difference between the second measured peak signal $V_{P2}$ and the first measured peak signal $V_{P1}$, the bias error signal $V_{BS}$ may correspond to the DC component (e.g., DC offset, bias) of the original analog input signal $V_I$. The differential amplifier 118 may output the bias error signal $V_{BS}$ through its output 1008, which may be coupled to an input of the LPF 120. Put differently, the differential amplifier 118 may provide the bias error signal $V_{BS}$ to the LPF 120 for further signal processing.

Figure 11A:
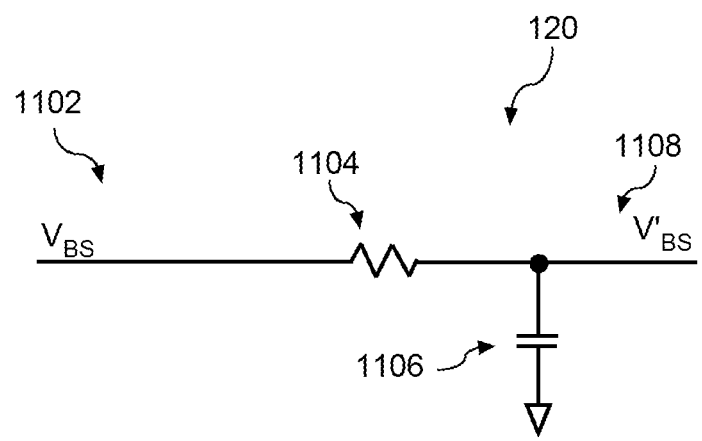
FIGS. 11A-11B depict an example low-pass filter (LPF) of the example bias detection circuit of FIGS. 9A-9B according to example embodiments of the present disclosure.
Figure 11B:
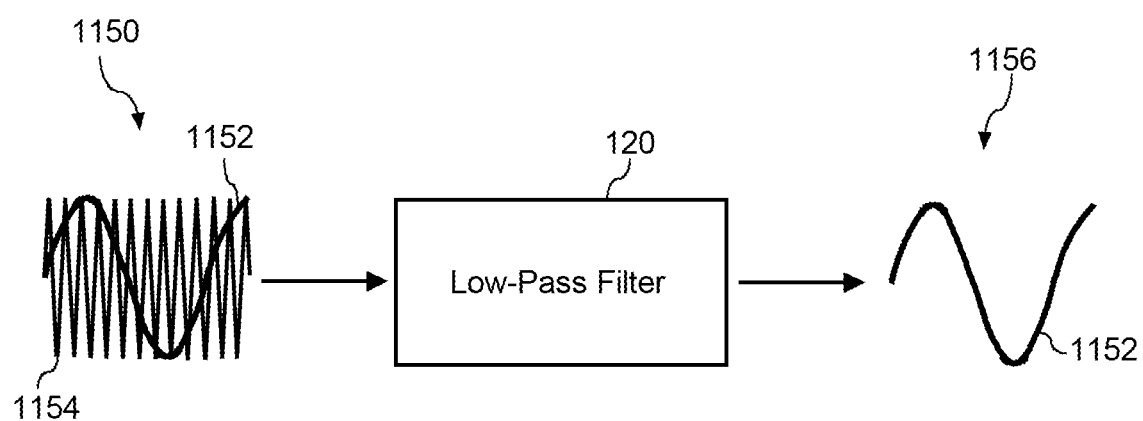
Figure 12A:
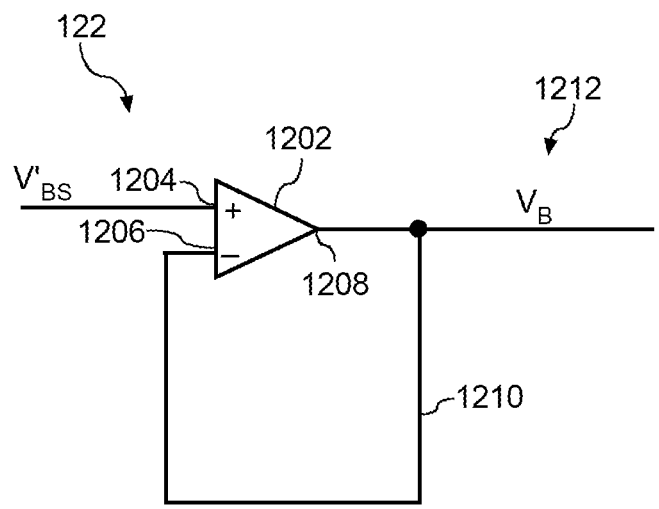
FIGS. 12A-12B depict an example buffer of the example bias detection circuit of FIGS. 9A-9B according to example embodiments of the present disclosure.
Figure 12B:
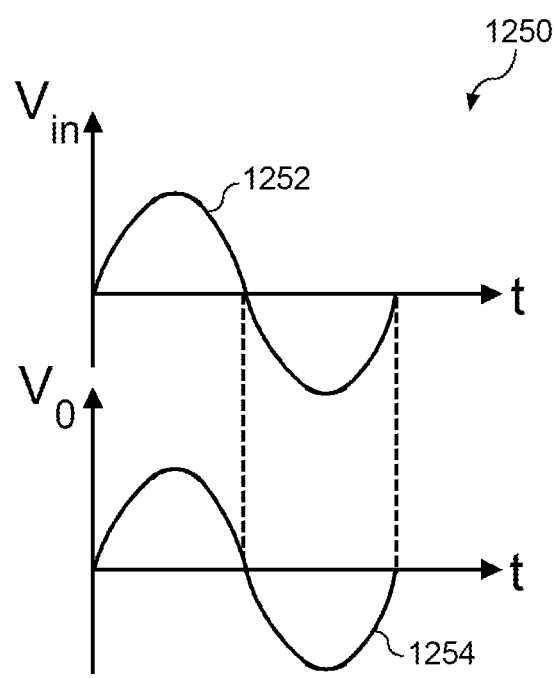

An example low-pass filter (LPF) 120 is depicted in FIGS. 11A-11B. FIG. 11A depicts a circuit schematic of the example LPF 120, and FIG. 11B depicts a functional diagram of the LPF 120. In some embodiments, the LPF 120 may be a passive low-pass filter. Furthermore, the LPF 120 may include a plurality of analog components. For instance, as shown in FIG. 11A, the LPF 120 may include an input 1102 coupled to the output 1008 of the differential amplifier 118. In this way, the LPF 120 may be configured to receive the bias error signal $V_{BS}$ from the differential amplifier 118. The LPF 120 may further include a resistor 1104 coupled to the input 1102. The LPF 120 may also include a capacitor 1106 coupled between an output of the resistor 1104 and ground. It should be understood that any suitable low-pass filter having any suitable configuration of components may be used without deviating from the scope of the present disclosure.

LPF 120 may remove signal components of the received bias error signal $V_{BS}$ above a threshold frequency (hereinafter referred to as "LPF frequency threshold"). For instance, referring to FIG. 11B, LPF 120 may receive an input signal 1150. Input signal 1150 may include a low-frequency component 1152 that is below the LPF frequency threshold and a high-frequency component 1154 that is above the LPF frequency threshold. In such instances, LPF 120 may receive the input signal 1150 and filter out components of input signal 1150 above the LPF frequency threshold (e.g., high-frequency component 1154). In this manner, LPF 120 may be configured to output a modified signal 1156 that includes the low-frequency components 1152, but excludes the high-frequency components 1154, of input signal 1150. It should be understood that the signals depicted in FIG. 11B are for purposes of illustration and discussion.

In this way, referring again to FIG. 11A, LPF 120 may receive the bias error signal $V_{BS}$ from the differential amplifier 118 and generate (e.g., output) a modified bias error signal $V'_{BS}$. As described above, the modified bias error signal $V'_{BS}$ output by LPF 120 may include components of the bias error signal $V_{BS}$ below the LPF frequency threshold but may exclude components of the modified bias error signal V'$_{BS}$ above the LPF frequency threshold. In some embodiments, the components of the bias error signal V$_{BS}$ removed by the LPF 120 may correspond to signal distortions, such as electromagnetic noise. In this manner, the modified bias error signal V'$_{BS}$ may correspond to the bias error signal V$_{BS}$ having one or more signal distortions (e.g., electromagnetic noise) removed therefrom. Furthermore, the LPF 120 may output the modified bias error signal V'$_{BS}$ through an output 1108 of the LPF 120, which may be coupled to the buffer 122. Put differently, the LPF 120 may provide the modified bias error signal V'$_{BS}$ to the buffer 122 for further signal processing.

An example buffer 122 of bias detection circuit 116 is depicted in FIGS. 12A-12B. FIG. 12A depicts a circuit schematic of the example buffer 122, and FIG. 12B depicts a time-aligned chart 1250 illustrating operation of the buffer 122. The buffer 122 may include a plurality of analog components. For instance, as shown in FIG. 12A, the buffer may include an operational amplifier 1202 having a first input 1204 (e.g., positive terminal) and a second input 1206 (e.g., negative terminal). The first input 1204 may be coupled to the output 1108 of the LPF 120 (FIGS. 11A-11B). In this way, the buffer 122 may be configured to receive the modified bias error signal V'$_{BS}$ from the LPF 120. Furthermore, the operational amplifier 1202 may include an output 1208 and a feedback loop 1210 coupled thereto. The feedback loop 1210 may also be coupled to the second input 1206.

In some embodiments, such as that depicted in FIG. 12A, the buffer 122 may be a unity gain buffer and/or a unity-gain amplifier. It should be noted that "unity gain buffer" and "unity-gain amplifier" may be used interchangeably. Unity-gain amplifiers (e.g., buffer 122) may operate as repeaters and/or buffers that do not apply amplification and/or attenuation to an input signal (e.g., modified bias error signal V'$_{BS}$). In other words, as shown in chart 1250 of FIG. 12B, an example unity-gain amplifier may provide a voltage gain of 1 to an input signal 1252. As such, an output signal 1254 of the unity-gain amplifier (e.g., buffer 122) is a recreation of the input signal 1252.

In this manner, referring again to FIG. 12A, buffer 122 may receive the modified bias error signal V'$_{BS}$ from the LPF 120. Furthermore, as described above, the buffer 122 may generate (e.g., output) a bias signal V$_B$ by applying a unity voltage gain (e.g., voltage gain of 1) to the modified bias error signal V'$_{BS}$. In this way, buffer 122 is configured to provide constant supply of the bias signal V$_B$, which is a recreation of the modified bias error signal V'$_{BS}$, to the remaining portions of the signal processing system 100 through an output 1212 of the buffer 122. More specifically, the buffer 122 may provide a constant supply of the bias signal V$_B$ via its output 1212 to an input of the bias removal circuit 124.

Referring now to FIGS. 13A-13B, an example bias removal circuit 124 is depicted. FIG. 13A depicts a circuit schematic of the bias removal circuit 124, and FIG. 13B depicts a block diagram of the bias removal circuit 124. As noted above, the bias removal circuit 124 may include a differential amplifier 126. Furthermore, the bias removal circuit 124 may be configured to receive the bias signal V$_B$ from the bias detection circuit 116 and the analog input signal V$_{I3}$ from the input transmission line 150, and the bias removal circuit 124 may be configured to output the analog output signal V$_{OUT}$. More particularly, as will be discussed in greater detail below, the bias removal circuit 124 may be configured to generate the analog output signal V$_{OUT}$ based at least in part on the analog input signal V$_{I3}$ received from the input transmission line 150 and the bias signal V$_B$ received from the bias detection circuit 116. Moreover, the analog output signal V$_{OUT}$ may correspond to the analog input signal V$_I$ having the DC component (e.g., bias signal V$_B$) removed therefrom.

A circuit schematic of an example differential amplifier 126 is depicted in FIG. 13A. The differential amplifier 126 may include a plurality of analog components. For instance, as shown in FIG. 13A, the differential amplifier 126 may include an operational amplifier 1302 having a first input 1304 (e.g., negative terminal) and a second input 1306 (e.g., positive terminal). The first input 1304 may be coupled to an output of the bias detection circuit. More specifically, the first input 1304 may be coupled to the output 1212 of the buffer 122. In this way, the differential amplifier 126 may be configured to receive the bias signal V$_B$ from the bias detection circuit 116 at the first input 1304. Furthermore, the second input 1306 may be coupled to the input transmission line 150. In this way, the differential amplifier 126 may be configured to receive the analog input signal V$_{I3}$ over the input transmission line 150 at the second input 1306. It should be understood that the analog input signal V$_{I3}$ is the same signal as analog input signals V$_{I1}$ and V$_{I2}$.

The differential amplifier 126 may include an output 1308 and a feedback loop 1310 coupled thereto. The differential amplifier 126 may further include one or more resistor R configured to control a voltage gain of the differential amplifier 126. It should be understood that any suitable resistors having any suitable resistance value(s) may be used without deviating from the scope of the present disclosure. It should be further understood that any suitable differential amplifier having any suitable configuration of components may also be used without deviating from the scope of the present disclosure.

Similar to the differential amplifier 118 discussed above with reference to FIGS. 10A-10B, in some embodiments, the differential amplifier 126 may be a closed-loop differential amplifier. As such, the differential amplifier 126 may operate in a similar manner as that described above with reference to the differential amplifier 118. More specifically, the differential amplifier 126 may receive the bias signal V$_B$ from the bias detection circuit 116 at the first input 1304 and the analog input signal V$_{I3}$ over the input transmission line 150 at the second input 1306. Furthermore, differential amplifier 126 may generate (e.g., output) the analog output signal V$_{OUT}$, which is indicative of an output error (e.g., difference) between the analog input signal V$_{I3}$ and the bias signal V$_B$. As such, the analog output signal V$_{OUT}$ may be related to the analog input signal V$_I$ and the bias signal V$_B$. The analog output signal V$_{OUT}$ may be represented by the equation:

$$V_{OUT} = V_I - V_B$$

As noted above, the bias signal V$_B$ output by the bias detection circuit 116 corresponds to the DC component (e.g., DC offset, bias) of the analog input signal V$_I$. As such, by subtracting the bias signal V$_B$ from the analog input signal V$_I$, the differential amplifier 126 is configured to output a signal (e.g., analog output signal V$_{OUT}$) that includes the AC component, but excludes the DC component (e.g., V$_B$), of the analog input signal V$_I$ from an output 1312 of the differential amplifier 126. Thus, the analog output signal V$_{OUT}$ corresponds to the analog input signal V$_I$ having its corresponding DC component removed therefrom. Put differently, the analog output signal $V_{OUT}$ corresponds to the AC component of the analog input signal $V_I$.

Through the design described above, the signal processing system 100 may generate (e.g., output) an analog output signal $V_{OUT}$ without any undesirable signal distortions (e.g., phase shift, delay, latency) under ideal functionality. However, it should be noted that some negligible distortion will take place in any physical surface. Furthermore, the signal processing system 100 may generate (e.g., output) the analog output signal $V_{OUT}$ without digitizing the analog input signal $V_I$, without requiring any user input, and without training and/or conditioning. Furthermore, the signal processing system 100 described above does not require an external clock or isolate, does not require an external memory, and only requires a single input line (e.g., input transmission line 150).

Figure 14:
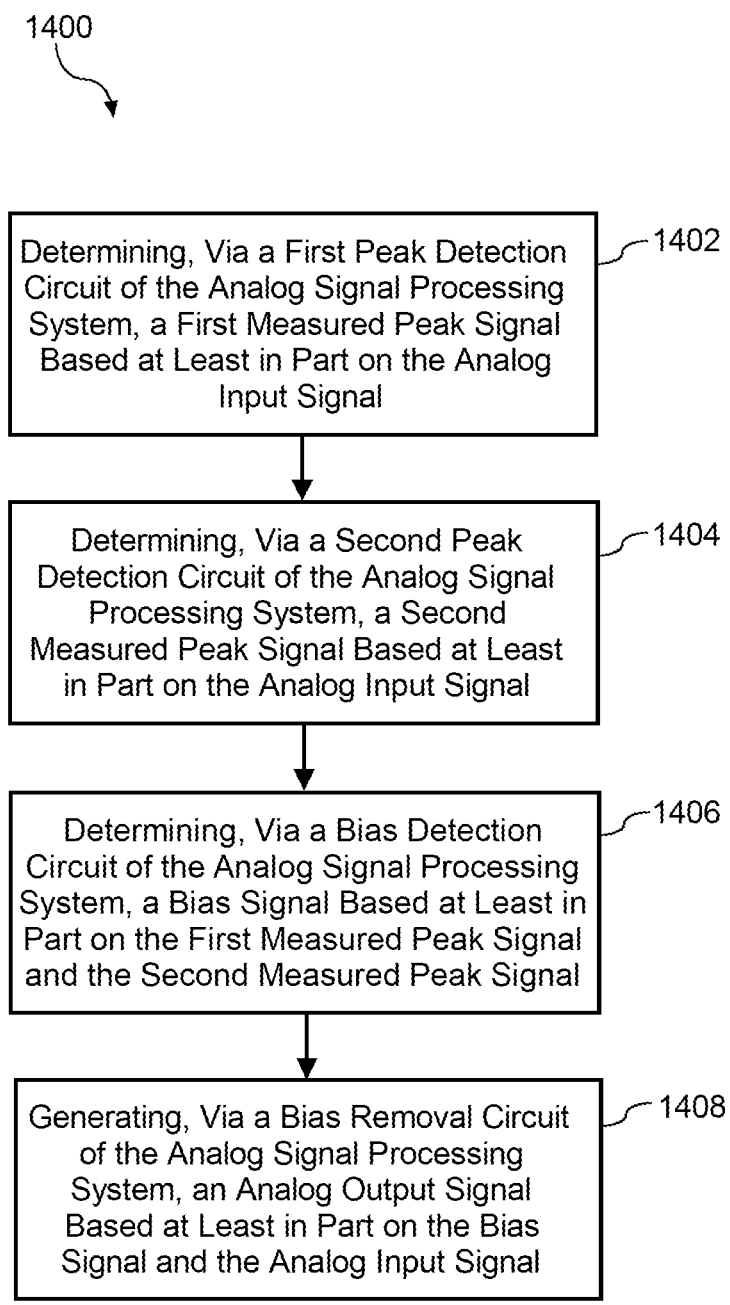
FIG. 14 depicts a flow diagram of an example method according to example embodiments of the present disclosure.

FIG. 14 depicts a flow chart diagram of an example method 1400 according to example embodiments of the present disclosure. More specifically, FIG. 14 depicts the method 1400 for removing a direct-current (DC) component from an analog input signal (e.g., analog input signal $V_I$). FIG. 14 depicts example method steps for purposes of illustration and discussion. Additionally, method 1400 is generally discussed with reference to the signal processing system 100 (and the components therein) described above with reference to FIGS. 1A-13B. Those of ordinary skill in the art, using the disclosures provided herein, will understand that the methods described in the present disclosure may be adapted, modified, include steps not illustrated, omitted, and/or rearranged without deviating from the scope of the present disclosure.

At (1402), the method 1400 may include determining, via a first reference measurement circuit of an analog signal processing system, a first measured peak signal based at least in part on the analog input signal. More particularly, as discussed above, a first reference measurement circuit (e.g., first reference measurement circuit 102) may receive an analog input signal (e.g., $V_{I1}$) from an input transmission line (e.g., input transmission line 150) and may determine a first measured peak signal (e.g., $V_{P1}$) based on the analog input signal $V_{I1}$.

Figure 15:
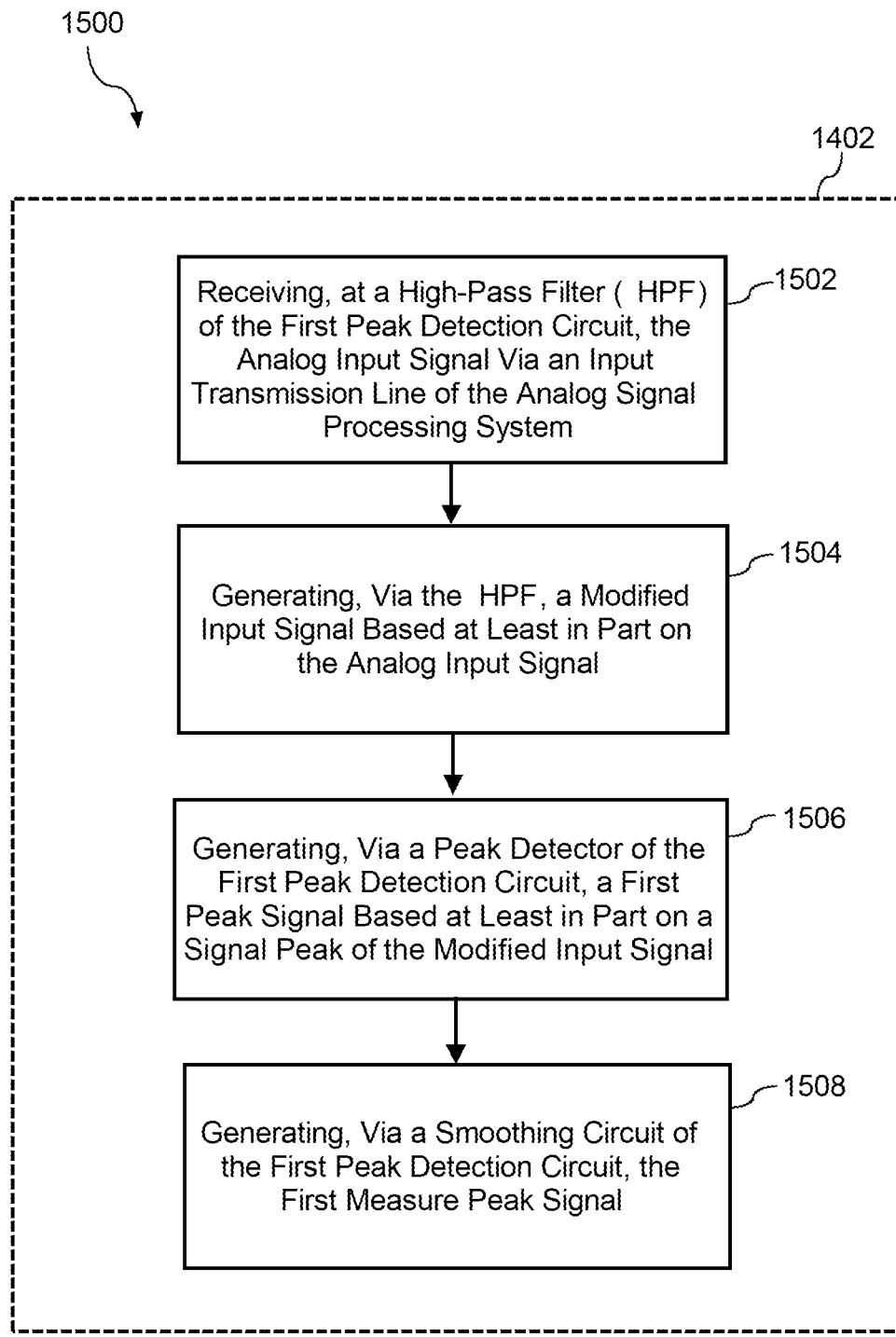
FIG. 15 depicts a flow diagram of an example method for determining a measured peak signal according to example embodiments of the present disclosure.

By way of example, FIG. 15 depicts a flow chart diagram of an example method 1500 for determining a first measured peak signal at (1402). FIG. 15 depicts example method steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

Referring to FIG. 15 at (1502), the method 1500 may include receiving, at a high-pass filter (HPF) of the first reference measurement circuit, the analog input signal via an input transmission line of the analog signal processing system. For instance, an HPF (e.g., HPF 104) of a first reference measurement circuit (e.g., first reference measurement circuit 102) may be coupled to an input transmission line (e.g., input transmission line 150), over which the first reference measurement circuit 102 may receive an analog input signal $V_I$ (e.g., $V_{I1}$).

At (1504), the method 1500 may include generating, via the HPF, a modified input signal based at least in part on the analog input signal. For instance, the HPF 104 of the first reference measurement circuit 102 may generate a modified input signal (e.g., modified input signal $V'_{I1}$) based at least in part on the analog input signal $V_{I1}$ received at (1502). To generate the modified input signal $V'_{I1}$, the method 1500 may include removing, via the HPF, components of the analog input signal below an HPF frequency threshold. More specifically, as described above, the HPF 104 may remove components of the analog input signal $V_{I1}$ that fall below the HPF frequency threshold. In some embodiments, the components of the analog input signal $V_{I1}$ removed by the HPF 104 correspond to a DC offset of the analog input signal $V_{I1}$. Furthermore, responsive to removing the components of the analog input signal $V_{I1}$ below the HPF frequency threshold, the HPF 104 may generate the modified input signal $V'_{I1}$.

Referring to FIG. 15 at (1506), the method 1500 may include generating, via a peak detector of the first reference measurement circuit, a first peak signal based at least in part on the signal peak of the modified input signal. For instance, a peak detector (e.g., peak detector 106) of the first reference measurement circuit 102 may generate a first peak signal (e.g., first peak signal $V_{PS1}$) based at least in part on a signal peak of the modified input signal $V'_{I1}$. To generate the first peak signal $V_{PS1}$, the method 1500 may include receiving, at the peak detector of the first reference measurement circuit, the modified input signal from the HPF. The method 1500 may further include measuring, via the peak detector of the first reference measurement circuit, a signal peak of the modified input signal. More specifically, as described above, the peak detector 106 may receive the modified input signal $V'_{I1}$ from the HPF 104. The peak detector 106 may then measure a signal peak of the modified input signal $V'_{I1}$. Responsive to measuring the signal peak, the peak detector 106 may generate the first peak signal $V_{PS1}$.

Referring to FIG. 15 at (1508), the method 1500 may include generating, via a smoothing circuit of the first reference measurement circuit, the first measured peak signal. For instance, a smoothing circuit (e.g., smoothing circuit 108) of the first reference measurement circuit 102 may generate a first measured peak signal (e.g., first measured peak signal $V_{P1}$) based at least in part on the first peak signal $V_{PS1}$. To generate the first measured peak signal $V_{P1}$, the method 1500 may include receiving, at the smoothing circuit of the first reference measurement circuit, the first peak signal from the peak detector of the first reference measurement circuit. The method 1500 may further include removing, via the smoothing circuit of the first reference measurement circuit, one or more signal infirmities from the first peak signal. More specifically, as described above, the smoothing circuit 108 may receive the first peak signal $V_{PS1}$ from the peak detector 106 of the first reference measurement circuit 102. The smoothing circuit 108 may then remove one or more signal infirmities (e.g., ripples) from the first peak signal $V_{PS1}$ that were produced by the signal processing performed by the peak detector 106. Responsive to removing the one or more signal infirmities, the smoothing circuit 108 may generate the first measured peak signal $V_{P1}$.

Figure 16:
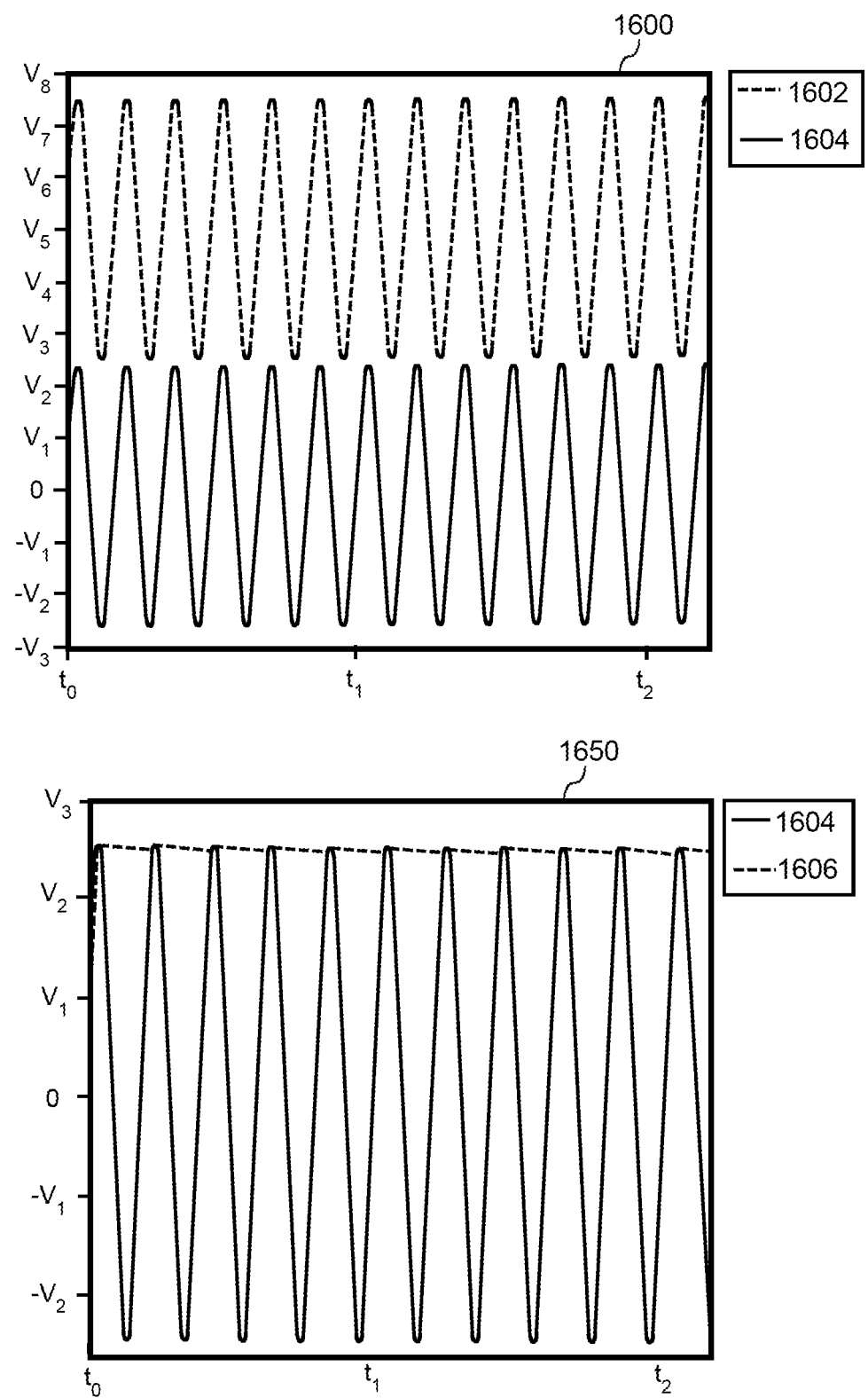
FIG. 16 depicts correlated plots of testing results of an example reference measurement circuit according to example embodiments of the present disclosure.

As an illustrative example, FIG. 16 depicts a series of time-aligned charts 1600, 1650 representing a working example of the method 1500. Chart 1600 depicts a signal 1602 (e.g., analog input signal $V_{I1}$) that is input to an HPF (e.g., HPF 104) and a signal 1604 (e.g., modified input signal $V'_{I1}$) that is output by the HPF 104. As shown, the HPF 104 may remove the components from the signal 1602 that fall below a designed HPF frequency threshold. In some embodiments, such as that shown in FIG. 16, the components removed from the signal 1602 correspond to the DC components of the signal 1602. In this manner, signal 1604 corresponds to the signal 1602 with the DC components removed therefrom.

However, as noted above, filters such as HPF 104 may impose undesirable distortions (e.g., phase shifts) between the current and voltage of the signal 1604. Typically, these distortions would be an undesirable condition for a signal processing system. However, as noted above, these distortions are acceptable for the signal processing system (e.g., signal processing system 100) of the present disclosure, because the HPF 104 is coupled to a peak detector (e.g., peak detector 106) which negates the undesirable signal distortions produced by the HPF 104.

For example, chart 1650 depicts the signal 1604 (e.g., modified input signal $V'_{I1}$) that was output by HPF 104. In chart 1650, signal 1604 is input to a peak detector (e.g., peak detector 106). Chart 1650 further depicts a signal 1606 (e.g., first peak signal $V_{PS1}$) that is output by peak detector 106. As shown, the peak detector 106 may measure the signal peaks of the signal 1604 and generate the signal 1606, which corresponds to the signal peaks of the signal 1604.

As may be seen in chart 1650, the nature and design of the peak detector 106 negates the undesirable signal distortions in signal 1604 produced by the HPF 104 because the peak detector 106 measures the signal peaks of the signal 1604, and the signal peaks are independent of (e.g., not affected by) the phase of signal 1604. However, as noted above, peak detectors such as peak detector 106 may likewise produce one or more signal infirmities in signal output therefrom. More specifically, as shown, the signal 1606 output from the peak detector 106 may include one or more ripples. However, as further noted above, these signal infirmities are acceptable for the signal processing system (e.g., signal processing system 100) of the present disclosure, because the peak detector 106 is coupled to a smoothing circuit (e.g., smoothing circuit 108) which addresses (e.g., smooths) the signal infirmities of signal 1606 produced by the peak detector 106. Although not depicted in FIG. 16, the smoothing circuit 108 may output signal 2002 (e.g., first measured peak signal $V_{P1}$) discussed below with reference to FIG. 20.

Returning to FIG. 14 at (1404), the method 1400 may include determining, via a second reference measurement circuit of the analog signal processing system, a second measured peak signal based at least in part on the analog input signal. More particularly, as discussed above, a second reference measurement circuit (e.g., second reference measurement circuit 110) may receive the analog input signal (e.g., $V_{I2}$) from the input transmission line 150 and may determine a second measured peak signal (e.g., $V_{P2}$) based on the analog input signal $V_{I2}$.

Figure 17:
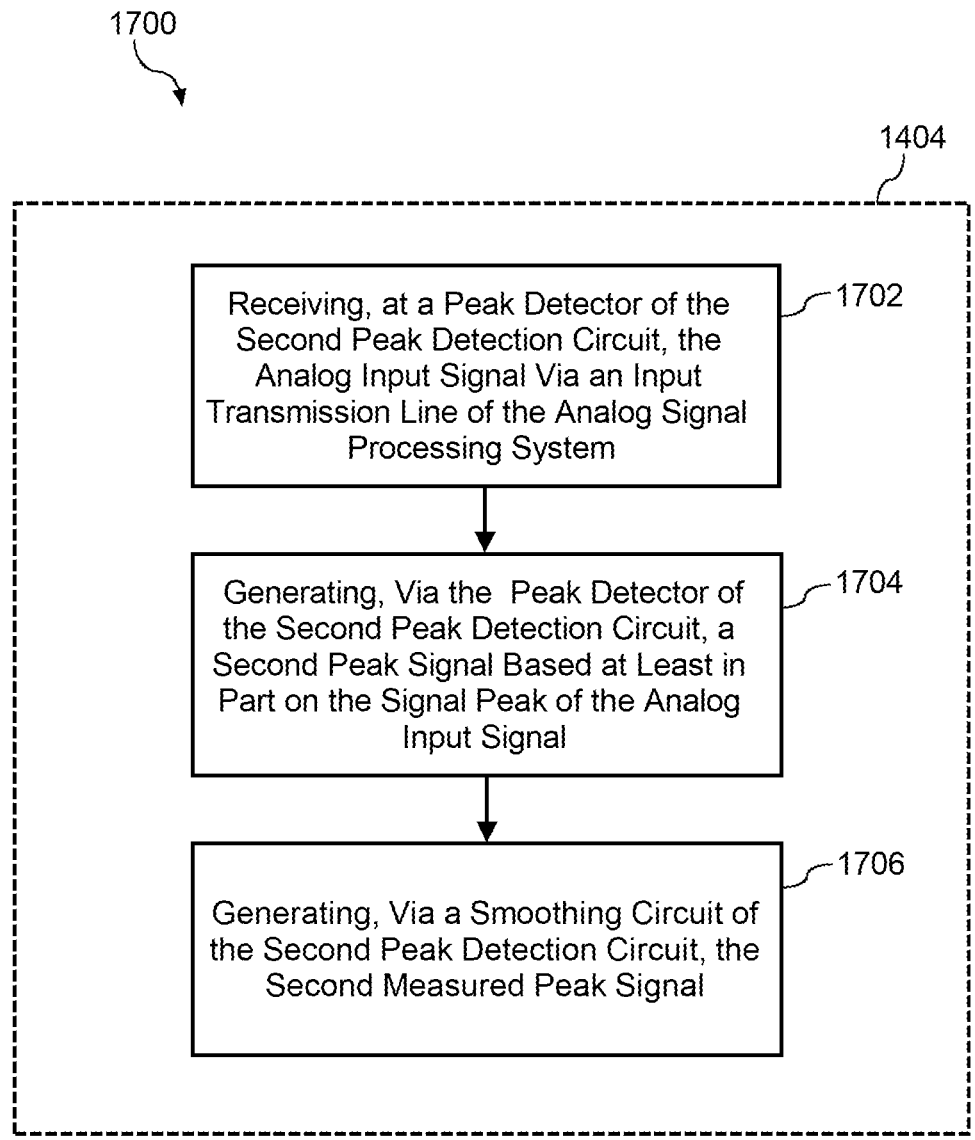
FIG. 17 depicts a flow diagram of an example method for determining a measured peak signal according to example embodiments of the present disclosure.

By way of example, FIG. 17 depicts a flow chart diagram of an example method 1700 for determining a second measured peak signal at (1404). FIG. 17 depicts example method steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

Referring to FIG. 17 at (1702), the method 1700 may include receiving, at a peak detector of the second reference measurement circuit, the analog input signal via an input transmission line of the analog signal processing system. For instance, a peak detector (e.g., peak detector 112) of a second reference measurement circuit (e.g., reference measurement circuit 110) may be coupled to an input transmission line (e.g., input transmission line 150), over which the second reference measurement circuit 110 may receive an analog input signal $V_I$ (e.g., analog input signal $V_{I2}$).

Referring to FIG. 17 at (1704), the method 1700 may include generating, via the peak detector of the second reference measurement circuit, a second peak signal based at least in part on the signal peak of the analog input signal. For instance, the peak detector 112 of the second reference measurement circuit 110 may generate a second peak signal (e.g., second peak signal $V_{PS2}$) based at least in part on a signal peak of the analog input signal $V_{I2}$. To generate the second peak signal $V_{PS2}$, the method 1700 may include measuring, via the peak detector of the second reference measurement circuit, a signal peak of the analog input signal. More specifically, as described above, the peak detector 112 may receive the analog input signal $V_{I2}$ over the input transmission line 150. The peak detector 112 may then measure a signal peak of the of the analog input signal $V_{I2}$. Responsive to measuring the signal peak, the peak detector 112 may generate the second peak signal $V_{PS2}$.

Referring to FIG. 17 at (1706), the method 1700 may include generating, via a smoothing circuit of the second reference measurement circuit, the second measured peak signal. For instance, a smoothing circuit (e.g., smoothing circuit 114) of the second reference measurement circuit 110 may generate a second measured peak signal (e.g., second measured peak signal $V_{P2}$) based at least in part on the second peak signal $V_{PS2}$. To generate the second measured peak signal $V_{P2}$, the method 1700 may include receiving, at the smoothing circuit of the second reference measurement circuit, the second peak signal from the peak detector of the second reference measurement circuit. The method 1700 may further include removing, via the smoothing circuit of the second reference measurement circuit, one or more signal infirmities from the second peak signal. More specifically, as described above, the smoothing circuit 114 may receive the second peak signal $V_{PS2}$ from the peak detector 112 of the second reference measurement circuit 110. The smoothing circuit 114 may then remove one or more signal infirmities (e.g., ripples) from the second peak signal $V_{PS2}$ that were produced by the signal processing performed by the peak detector 112. Responsive to removing the one or more signal infirmities, the smoothing circuit 114 may generate the second measured peak signal $V_{P2}$.

Figure 18:
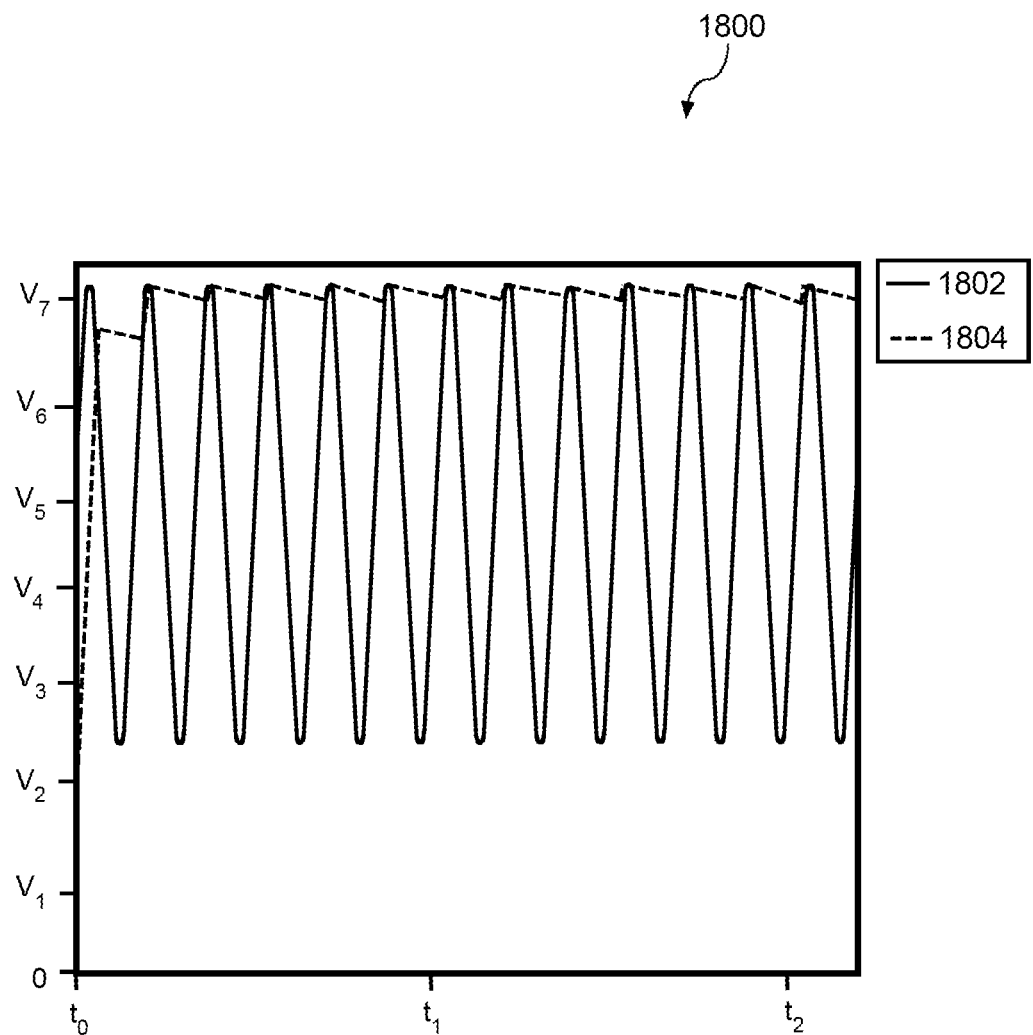
FIG. 18 depicts correlated plots of testing results of an example reference measurement circuit according to example embodiments of the present disclosure.

As an illustrative example, FIG. 18 depicts a time-aligned chart 1800 representing a working example of the method 1700 and is a continuation of the working example of method 1500 set forth in FIG. 16. Chart 1800 depicts a signal 1802 (e.g., analog input signal $V_{I2}$) that is input to a peak detector (e.g., peak detector 112) and a signal 1804 (e.g., second peak signal $V_{PS2}$) that is output by the peak detector 112. As shown, the peak detector 112 may measure the signal peaks of the signal 1802 and generate the signal 1804, which corresponds to the signal peaks of the signal 1802.

As may be seen in chart 1800, peak detectors such as peak detector 112 may produce one or more signal infirmities in signal output therefrom. More specifically, as shown, the signal 1804 may include one or more ripples. However, as noted above, these signal infirmities are acceptable for the signal processing system (e.g., signal processing system 100) of the present disclosure, because the peak detector 112 is coupled to a smoothing circuit (e.g., smoothing circuit 114) which addresses (e.g., smooths) the signal infirmities of signal 1804 produced by the peak detector 112. Although not depicted in FIG. 18, the smoothing circuit 114 may output signal 2004 (e.g., second measured peak signal $V_{P2}$) discussed below with reference to FIG. 20.

Returning to FIG. 14 at (1406), responsive to determining the first measured peak signal at (1402) and the second measured peak signal at (1404), the method 1400 may include determining, via a bias detection circuit of the analog signal processing system, a bias signal based at least in part on the first measured peak signal and the second measured peak signal. More particularly, as noted above, a bias detection circuit (e.g., bias detection circuit 116) may receive the first measured peak signal $V_{P1}$ from the first reference measurement circuit 102 and the second measured peak signal $V_{P2}$ from the second reference measurement circuit 110. Furthermore, in response to receiving the first measured peak signal $V_{P1}$ and the second measured peak signal $V_{P2}$, the bias detection circuit 116 may generate a bias signal (e.g., $V_B$) based on the first measured peak signal $V_{P1}$ and the second measured peak signal $V_{P2}$. As further noted above, the bias signal $V_B$ may be indicative of the DC component of the analog input signal $V_I$.

Figure 19:
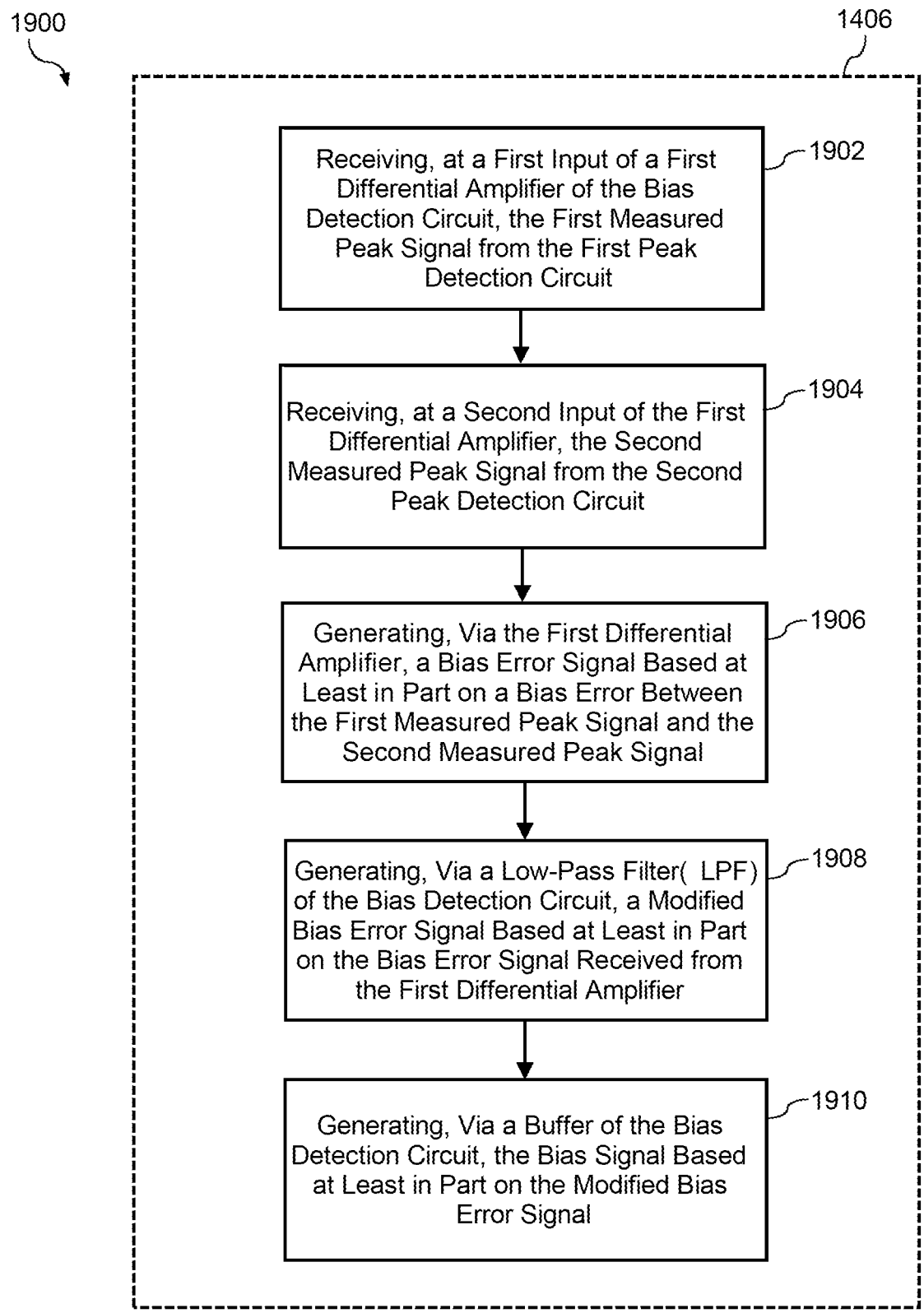
FIG. 19 depicts a flow diagram of an example method for determining a bias signal according to example embodiments of the present disclosure.

By way of example, FIG. 19 depicts a flow chart diagram of an example method 1900 for determining a bias signal at (1406). FIG. 19 depicts example method steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

Referring to FIG. 19 at (1902), the method 1900 may include receiving, at a first input of a first differential amplifier of the bias detection circuit, the first measured peak signal from the first reference measurement circuit. For instance, a first differential amplifier (e.g., differential amplifier 118) of a bias detection circuit (e.g., bias detection circuit 116) may include a first input (e.g., first input 1004) that is coupled to an output of the first reference measurement circuit 102. More specifically, the first input 1004 may be coupled to an output (e.g., output 508) of a smoothing circuit (e.g., smoothing circuit 108) of the first reference measurement circuit 102. In this manner, the first differential amplifier 118 may receive a first measured peak signal (e.g., first measured peak signal $V_{P1}$) from the first reference measurement circuit 102 at the first input 1004.

Referring to FIG. 19 at (1904), the method 1900 may include receiving, at a second input of the first differential amplifier, the second measured peak signal from the second reference measurement circuit. For instance, a first differential amplifier (e.g., differential amplifier 118) may include a second input (e.g., second input 1006) that is coupled to an output of the second reference measurement circuit 110. More specifically, the second input 1006 may be coupled to an output (e.g., output 708) of a smoothing circuit (e.g., smoothing circuit 114) of the second reference measurement circuit 110. In this manner, the first differential amplifier 118 may receive a second measured peak signal (e.g., second measured peak signal $V_{P2}$) from the second reference measurement circuit 110 at the second input 1006.

Referring to FIG. 19 at (1906), the method 1900 may include generating, via the first differential amplifier, a bias error signal based at least in part on the bias error between the first measured peak signal and the second measured peak signal. For instance, the first differential amplifier (e.g., differential amplifier 118) may generate a bias error signal (e.g., bias error signal $V_{BS}$) based at least in part on a bias error (e.g., difference) between the first measured peak signal $V_{P1}$ and the second measured peak signal $V_{P2}$. To generate the bias error signal $V_{BS}$, the method 1900 may include determining, via the first differential amplifier, a bias error between the first measured peak signal and the second measured peak signal. More specifically, as described above, the first differential amplifier 118 may determine a bias error (e.g., difference) between the first measured peak signal $V_{P1}$ and the second measured peak signal $V_{P2}$. In some instances, the bias error may correspond to the DC component of the analog input signal $V_I$. Responsive to determining the bias error, the first differential amplifier 118 may generate the bias error signal $V_B$ based at least in part on the bias error between the first measured peak signal $V_{P1}$ and the second measured peak signal $V_{P2}$.

Referring to FIG. 19 at (1908), the method 1900 may include generating, via a low-pass filter (LPF), a modified bias error signal based at least in part on the bias error signal received from the first differential amplifier. For instance, a low-pass filter (LPF) (e.g., LPF 120) of the bias detection circuit 116 may generate a modified bias error signal (e.g., modified bias error signal $V'_{BS}$) based at least in part on the bias error signal $V_{BS}$ generated by the first differential amplifier 118. To generate the modified bias error signal $V'_{BS}$, the method 1900 may include receiving, at a low-pass filter (LPF) of the bias detection circuit, the bias error signal from the first differential amplifier. The method 1900 may further include removing, via the LPF, components of the bias error signal above an LPF frequency threshold. More specifically, as described above, the LPF 120 may receive the bias error signal $V_{BS}$ from the differential amplifier 118. The LPF 120 may then remove components of the bias error signal $V_{BS}$ that are above an LPF frequency threshold. In some embodiments, the components of the bias error signal $V_{BS}$ removed by the LPF 120 may correspond to, e.g., electromagnetic noise. Responsive to removing the components from the bias error signal $V_{BS}$ above the LPF frequency threshold, the LPF 120 may generate the modified bias error signal $V'_{BS}$.

Referring to FIG. 19 at (1910), the method 1900 may include generating, via a buffer, the bias signal based at least in part on the modified bias error signal. For instance, a buffer (e.g., buffer 122) of the bias detection circuit 116 may generate a bias signal (e.g., bias signal $V_B$) based at least in part on the modified bias error signal $V'_{BS}$. To generate the bias signal $V_B$, the method 1900 may include receiving, at the buffer of the bias detection circuit, the modified bias error signal from the LPF. The method 1900 may further include applying, via the buffer, a voltage gain to the bias error signal. More specifically, as described above, the buffer 122 may receive the modified bias error signal $V'_{BS}$ from the LPF 120. The buffer 122 may then apply a voltage gain of, e.g., one, to the modified bias error signal $V'_{BS}$. Responsive to applying the voltage gain to the modified bias error signal $V'_{BS}$, the buffer 122 may generate the bias signal $V_B$. As noted above, the bias signal $V_B$ may correspond to the DC component of the analog input signal $V_I$.

Figure 20:
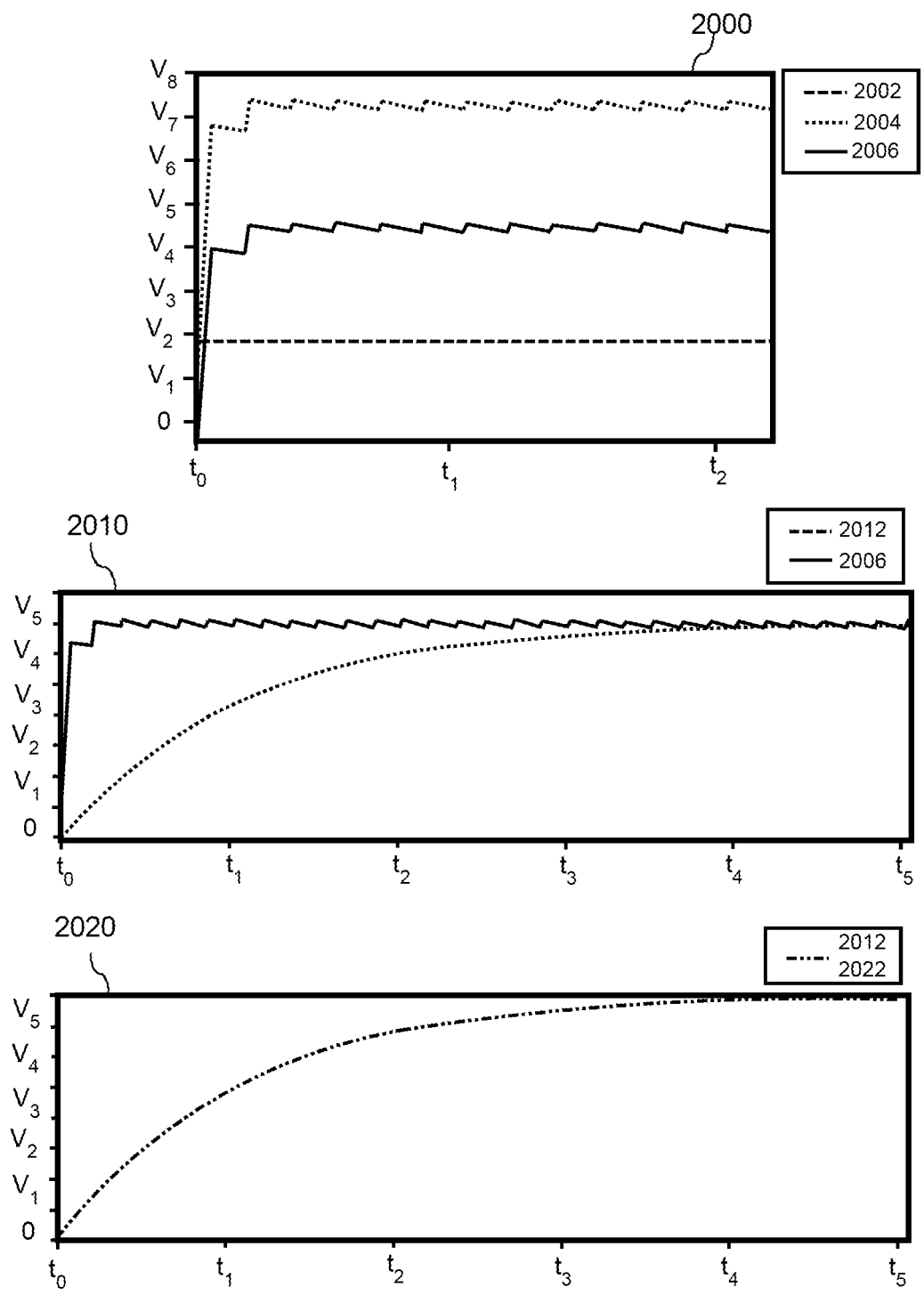
FIG. 20 depicts correlated plots of testing results of an example bias detection circuit according to example embodiments of the present disclosure.

As an illustrative example, FIG. 20 depicts a series of time-aligned charts 2000, 2010, 2020 representing a working example of the method 1900; FIG. 20 is a continuation of the working example of method 1500 set forth in FIG. 16 and the working example of method 1700 set forth in FIG. 18. Chart 2000 depicts a signal 2002 (e.g., first measured peak signal $V_{P1}$) that is input to a first input (e.g., first input 1004) of a first differential amplifier (e.g., differential amplifier 118). As noted above, signal 2002 corresponds to the signal output by a smoothing circuit (e.g., smoothing circuit 108) of a first reference measurement circuit (e.g., first reference measurement circuit 102). Chart 2000 further depicts a signal 2004 (e.g., second measured peak signal $V_{P2}$) that is input to a second input (e.g., second input 1006)

of the first differential amplifier (e.g., differential amplifier 118). As noted above, signal 2004 corresponds to the signal output by a smoothing circuit (e.g., smoothing circuit 114) of a second reference measurement circuit (e.g., second reference measurement circuit 110).

As shown in chart 2000, the first differential amplifier 118 may determine a difference (e.g., error) between signal 2002 and signal 2004. As such, the first differential amplifier 118 may output a signal 2006 (e.g., bias error signal $V_{BS}$) that corresponds to a DC component (e.g., offset, bias) of the analog input signal $V_I$. As noted above, the differential amplifier 118 may then provide the signal 2006 (e.g., bias error signal $V_{BS}$) to a low-pass filter (LPF) (e.g., LPF 120) for further signal processing.

Chart 2010 depicts the signal 2006 (e.g., bias error signal $V_{BS}$) that was output by the differential amplifier 118. In chart 2010, signal 2006 is input to a low-pass filter (LPF) (e.g., LPF 120). As discussed above, the LPF 120 may filter components of the signal 2006 that are above an LPF threshold frequency. More specifically, as shown in chart 2010, the LPF 120 may filter (e.g., remove) undesirable high-frequency components of the signal 2006. As such, the LPF 120 may output a signal 2012 (e.g., modified bias error signal $V'_{BS}$) that corresponds to the signal 2006 having the undesired high-frequency components removed therefrom. In this manner, the LPF 120 may provide a relatively smooth output signal (e.g., signal 2012) to the remaining portions of the signal processing system (e.g., signal processing system 100). More particularly, the LPF 120 may provide signal 2012 (e.g., modified bias error signal $V'_{BS}$) to a buffer (e.g., buffer 122) for further signal processing.

Chart 2020 depicts the signal 2012 (e.g., modified bias error signal $V'_{BS}$) that was output by the LPF 120. In chart 2020, signal 2012 is input to a first input (e.g., first input 1204) of a buffer (e.g., buffer 122). As discussed above, buffer 122 may act as a repeater. More specifically, as shown in chart 2020, buffer 122 may apply a voltage gain of, e.g., one, to signal 2012. As such, the buffer 122 may output a signal 2022 (e.g., bias signal $V_B$) that is a recreation of the signal 2012 (e.g., modified bias error signal $V'_{BS}$) input to the buffer 122. In this manner, buffer 122 may provide a constant supply of signal 2022 (e.g., bias signal $V_B$) to the remaining portions of the signal processing system (e.g., signal processing system 100).

Returning to FIG. 14 at (1408), the method 1400 may include generating, via a bias removal circuit of the analog signal processing system, an analog output signal based at least in part on the bias signal and the analog input signal. More particularly, as noted above, a bias removal circuit (e.g., bias removal circuit 124) may receive the analog input signal (e.g., $V_{I3}$) from the input transmission line 150 and the bias signal $V_B$ from the bias detection circuit 116. Furthermore, the bias removal circuit 124 may generate an analog output signal (e.g., $V_{OUT}$) based on the analog input signal $V_{I3}$ and the bias signal $V_B$. As further noted above, the analog output signal $V_{OUT}$ may be the analog input signal $V_I$ with its DC component (e.g., $V_B$) removed therefrom.

Figure 21:
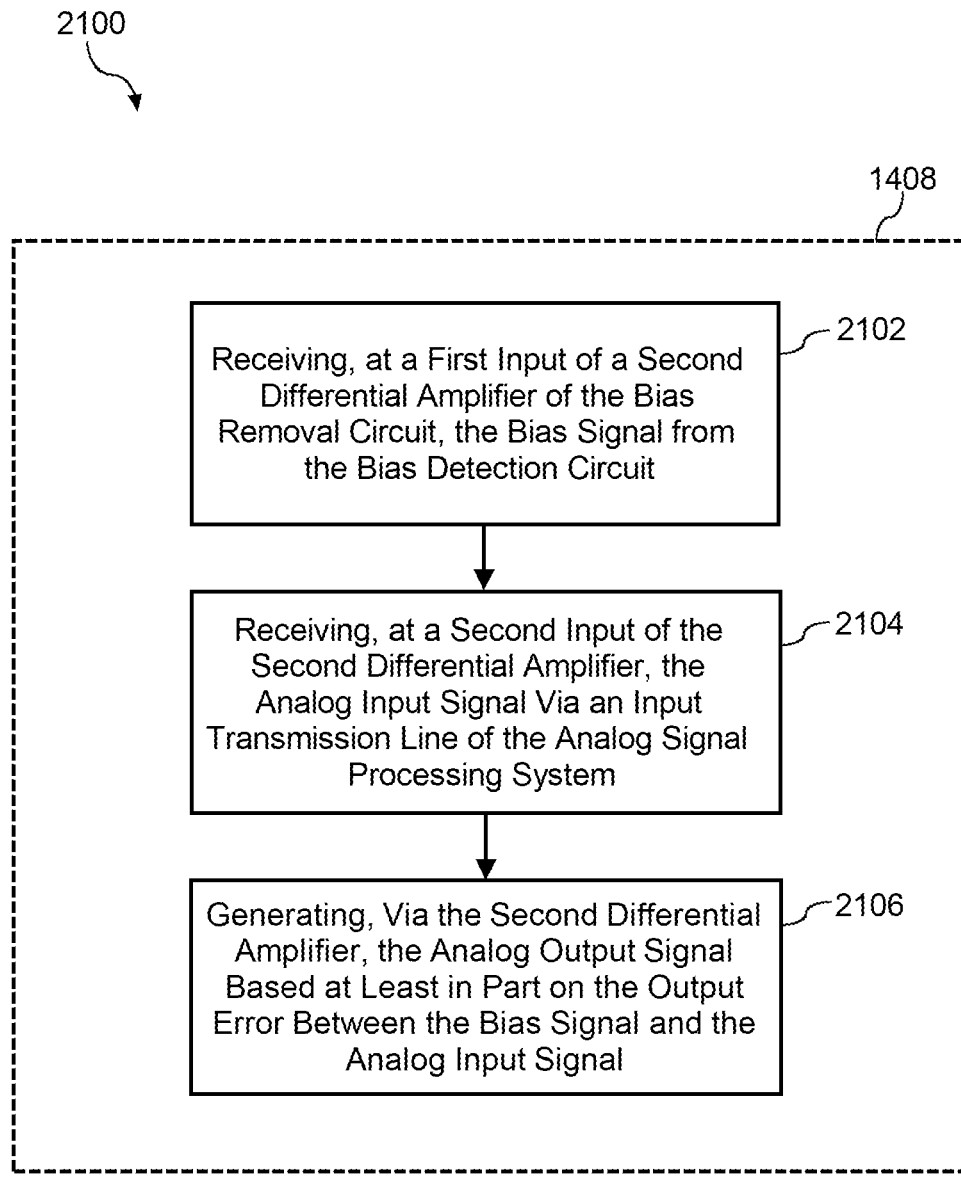
FIG. 21 depicts a flow diagram of an example method for generating an analog output signal according to example embodiments of the present disclosure.

By way of example, FIG. 21 depicts a flow chart diagram of an example method 2100 for generating an analog output signal at (1408). FIG. 21 depicts example method steps for purposes of illustration and discussion. Those of ordinary skill in the art, using the disclosures provided herein, will understand that the methods described in the present disclosure may be adapted, modified, include steps not illustrated, omitted, and/or rearranged without deviating from the scope of the present disclosure.

Referring to FIG. 21 at (2102), the method 2100 may include receiving, at a first input of a second differential amplifier of the bias removal circuit, the bias signal from the bias detection circuit. For instance, a second differential amplifier (e.g., differential amplifier 126) of a bias removal circuit (e.g., bias removal circuit 124) may include a first input (e.g., first input 1304) that is coupled to an output of the bias detection circuit 116. More specifically, the first input 1004 may be coupled to an output (e.g., output 1212) of a buffer (e.g., buffer 122) of the bias detection circuit 116. In this manner, the second differential amplifier 126 may receive a bias signal (e.g., bias signal $V_B$) from the bias detection circuit 116 at the first input 1304.

Referring to FIG. 21 at (2104), the method 2100 may include receiving, at a second input of the second differential amplifier, the analog input signal via an input transmission line of the analog signal processing system. For instance, a second differential amplifier (e.g., differential amplifier 126) may include a second input (e.g., second input 1306) that is coupled to an input transmission line (e.g., input transmission line 150) of the analog signal processing system 100. More specifically, the second input 1306 may be coupled to the input transmission line 150, and the input transmission line 150 may provide an analog input signal $V_I$ (e.g., analog input signal $V_{I3}$) to the second input 1306 of the second differential amplifier 126.

Referring to FIG. 21 at (2106), the method 2100 may include generating, via the second differential amplifier, the analog output signal based at least in part on the output error between the bias signal and the analog input signal. For instance, the second differential amplifier (e.g., differential amplifier 126) may generate an analog output signal (e.g., analog output signal $V_{OUT}$) based at least in part on an output error (e.g., difference) between the bias signal $V_B$ (received at the first input 1304) and the analog input signal $V_{I3}$ (received at the second input 1306). To generate the analog output signal $V_{OUT}$, the method 2100 may include determining, via the second differential amplifier, the output error between the bias signal and the analog input signal. More specifically, as described above, the second differential amplifier 126 may determine the output error (e.g., difference) between the bias signal $V_B$ and the analog input signal $V_{I3}$. In some instances, the output error may correspond to the AC component of the analog input signal $V_I$. Responsive to determining the output error, the second differential amplifier 126 may generate the analog output signal $V_{OUT}$, which corresponds to the analog input signal $V_I$ with its DC component removed therefrom. Put differently, the analog output signal $V_{OUT}$ may correspond to the AC component of the analog input signal $V_I$.

Figure 22:
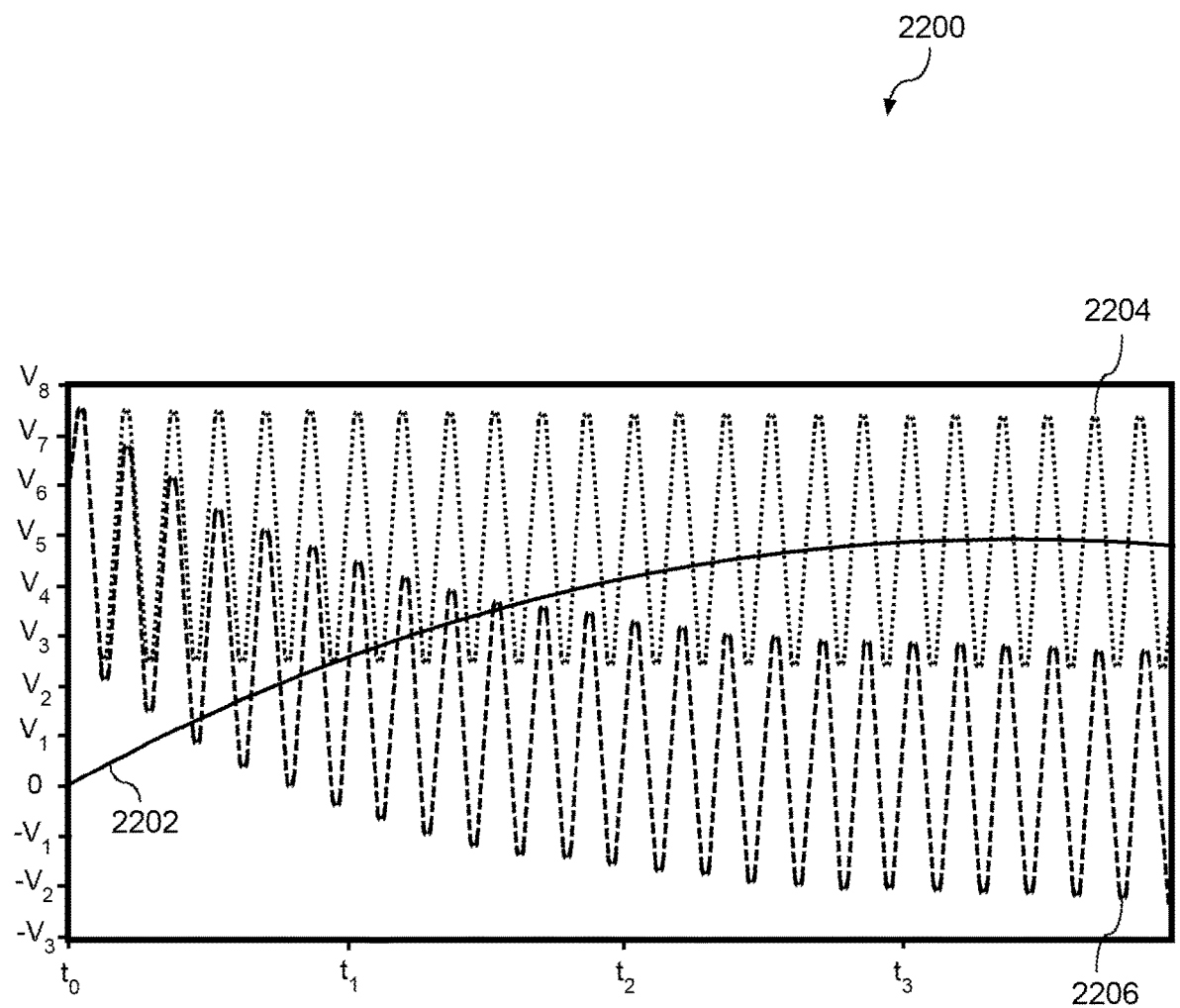
FIG. 22 depicts correlated plots of testing results of an example bias removal circuit according to example embodiments of the present disclosure.

As an illustrative example, FIG. 22 depicts a time-aligned chart 2200 representing a working example of the method 2100; FIG. 22 is a continuation of the working example of method 1500 set forth in FIG. 16, the working example of method 1700 set forth in FIG. 18, and the working example of method 1900 set forth in FIG. 20.

Chart 2200 depicts a signal 2202 (e.g., bias signal $V_B$) that is input to a first input (e.g., first input 1304) of a second differential amplifier (e.g., differential amplifier 126). It should be understood that signal 2202 corresponds to signal 2022 discussed above with reference to chart 2020 of FIG. 20. Chart 2200 further depicts a signal 2204 (e.g., analog input voltage $V_{I3}$) that is input to a second input (e.g., second input 1306) of the second differential amplifier (e.g., differential amplifier 126). It should be understood that signal 2204 corresponds to signal 1602 discussed above with reference to chart 1600 of FIG. 16 and further corresponds to signal 1802 discussed above with reference to chart 1800 of FIG. 18.

As shown in chart 2200, the second differential amplifier 126 may determine a difference (e.g., an error) between signal 2202 (e.g., bias signal $V_B$) and signal 2204 (e.g., analog input signal $V_B$). As such, the second differential amplifier 126 may output a signal 2206 (e.g., analog output signal $V_{OUT}$) that corresponds to an AC component of the analog input signal $V_I$. More particularly, as noted above, signal 2202 (e.g., bias signal $V_B$) may correspond to the DC component (e.g., offset, bias) of the analog input signal $V_I$. Thus, by removing the DC component (e.g., signal 2202) from the analog input signal $V_I$ (e.g., signal 2204), signal 2206 corresponds to the remaining AC component of the analog input signal $V_I$.

Accordingly, through the designs described herein, the signal processing system 100 may generate (e.g., output) an analog output signal $V_{OUT}$ (e.g., signal 2206) that does not include any undesirable signal distortions (under ideal functionality) caused by the components of the signal processing system 100. Moreover, the analog output signal $V_{OUT}$ (e.g., signal 2206) may be generated without digitizing the analog input signal $V_I$. Furthermore, the analog output signal $V_{OUT}$ (e.g., signal 2206) may be output by the signal processing system 100 without requiring any user input, any training, and/or any conditioning.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for removing a direct-current (DC) component from an analog input signal, the method comprising:
   determining, via a first reference measurement circuit of an analog signal processing system, a first measured peak signal based at least in part on the analog input signal;
   determining, via a second reference measurement circuit of the analog signal processing system, a second measured peak signal based at least in part on the analog input signal;
   responsive to determining the first measured peak signal and the second measured peak signal, determining, via a bias detection circuit of the analog signal processing system, a bias signal based at least in part on the first measured peak signal and the second measured peak signal, the bias signal indicative of the DC component of the analog input signal; and
   generating, via a bias removal circuit of the analog signal processing system, an analog output signal based at least in part on the bias signal and the analog input signal,
   wherein the analog output signal is the analog input signal with the DC component removed therefrom.

2. The method of claim 1, wherein determining the first measured peak signal comprises:
   receiving, at a high-pass filter (HPF) of the first reference measurement circuit, the analog input signal via an input transmission line of the analog signal processing system;
   removing, via the HPF, components of the analog input signal below an HPF frequency threshold, the components of the analog input signal removed by the HPF corresponding to a DC offset of the analog input signal; and
   responsive to removing the components of the analog input signal below the HPF frequency threshold, generating, via the HPF, a modified input signal based at least in part on the analog input signal.

3. The method of claim 2, wherein determining the first measured peak signal further comprises:
   receiving, at a peak detector of the first reference measurement circuit, the modified input signal from the HPF;
   measuring, via the peak detector of the first reference measurement circuit, a signal peak of the modified input signal; and
   responsive to measuring the signal peak, generating, via the peak detector of the first reference measurement circuit, a first peak signal based at least in part on the signal peak of the modified input signal.

4. The method of claim 3, wherein determining the first measured peak signal further comprises:
   receiving, at a smoothing circuit of the first reference measurement circuit, the first peak signal from the peak detector of the first reference measurement circuit;
   removing, via the smoothing circuit of the first reference measurement circuit, one or more signal infirmities from the first peak signal, the one or more signal infirmities produced by the peak detector of the first reference measurement circuit; and
   responsive to removing the one or more signal infirmities, generating, via the smoothing circuit of the first reference measurement circuit, the first measured peak signal.

5. The method of claim 1, wherein determining the second measured peak signal comprises:
   receiving, at a peak detector of the second reference measurement circuit, the analog input signal via an input transmission line of the analog signal processing system;
   measuring, via the peak detector of the second reference measurement circuit, a signal peak of the analog input signal; and
   responsive to measuring the signal peak, generating, via the peak detector of the second reference measurement circuit, a second peak signal based at least in part on the signal peak of the analog input signal.

6. The method of claim 5, wherein determining the second measured peak signal further comprises:
   receiving, at a smoothing circuit of the second reference measurement circuit, the second peak signal from the peak detector of the second reference measurement circuit;
   removing, via the smoothing circuit of the second reference measurement circuit, one or more signal infirmities from the second peak signal, the one or more signal infirmities produced by the peak detector of the second reference measurement circuit; and
   responsive to removing the one or more signal infirmities, generating, via the smoothing circuit of the second reference measurement circuit, the second measured peak signal.

7. The method of claim 1, wherein determining the bias signal comprises:
   receiving, at a first input of a first differential amplifier of the bias detection circuit, the first measured peak signal from the first reference measurement circuit;
   receiving, at a second input of the first differential amplifier, the second measured peak signal from the second reference measurement circuit;
   determining, via the first differential amplifier, a bias error between the first measured peak signal and the second measured peak signal; and
   responsive to determining the bias error, generating, via the first differential amplifier, a bias error signal based at least in part on the bias error between the first measured peak signal and the second measured peak signal.

8. The method of claim 7, wherein the bias error corresponds to the DC component of the analog input signal.

9. The method of claim 7, wherein determining the bias signal further comprises:
   receiving, at a low-pass filter (LPF) of the bias detection circuit, the bias error signal from the first differential amplifier;
   removing, via the LPF, components of the bias error signal above an LPF frequency threshold; and
   responsive to removing the components from the bias error signal, generating, via the LPF, a modified bias error signal based at least in part on the bias error signal received from the first differential amplifier.

10. The method of claim 9, wherein determining the bias signal further comprises:
    receiving, at a buffer of the bias detection circuit, the modified bias error signal from the LPF;
    applying, via the buffer, a voltage gain to the bias error signal; and
    responsive to applying the voltage gain, generating, via the buffer, the bias signal based at least in part on the modified bias error signal.

11. The method of claim 1, wherein generating the analog output signal comprises:
    receiving, at a first input of a second differential amplifier of the bias removal circuit, the bias signal from the bias detection circuit;
    receiving, at a second input of the second differential amplifier, the analog input signal via an input transmission line of the analog signal processing system;
    determining, via the second differential amplifier, an output error between the bias signal and the analog input signal; and
    responsive to determining the output error, generating, via the second differential amplifier, the analog output signal based at least in part on the output error between the bias signal and the analog input signal.

12. The method of claim 11, wherein the output error corresponds to an alternating-current (AC) component of the analog input signal.

13. A signal processing system comprising:
    an input transmission line operable to provide an analog input signal to the signal processing system, the analog input signal comprising a direct-current (DC) component and an alternating-current (AC) component;
    a first reference measurement circuit coupled to the input transmission line, the first reference measurement circuit configured to generate a first measured peak signal based at least in part on the analog input signal;
    a second reference measurement circuit coupled to the input transmission line, the second reference measurement circuit configured to generate a second measured peak signal based at least in part on the analog input signal, the second measured peak signal being different from the first measured peak signal;
    a bias detection circuit coupled to the first reference measurement circuit and the second reference measurement circuit, the bias detection circuit configured to generate a bias signal based at least in part on the first measured peak signal and the second measured peak signal; and
    a bias removal circuit coupled to the bias detection circuit and the input transmission line, the bias removal circuit configured to generate an analog output signal based at least in part on the bias signal and the analog input signal, the analog output signal corresponding to the analog input signal having the DC component removed therefrom,
    wherein each of the first reference measurement circuit, the second reference measurement circuit, the bias detection circuit, and the bias removal circuit comprise one or more analog components.

14. The signal processing system of claim 13, wherein the first reference measurement circuit comprises:
    a high-pass filter (HPF), an input of the HPF coupled to the input transmission line, the HPF configured to generate a modified input signal by removing components of the analog input signal below an HPF frequency threshold;
    a peak detector coupled to an output of the HPF, the peak detector configured to receive the modified input signal from the HPF, the peak detector configured to generate a first peak signal by measuring a signal peak of the modified input signal; and
    a smoothing circuit coupled to an output of the peak detector, the smoothing circuit configured to receive the first peak signal from the peak detector, the smoothing circuit configured to generate the first measured peak signal by removing one or more signal infirmities from the first peak signal, the one or more signal infirmities produced by the peak detector of the first reference measurement circuit.

15. The signal processing system of claim 13, wherein the second reference measurement circuit comprises:
    a peak detector, an input of the peak detector coupled to the input transmission line, the peak detector configured to generate a second peak signal by measuring a signal peak of the analog input signal; and
    a smoothing circuit coupled to an output of the peak detector, the smoothing circuit configured to receive the second peak signal from the peak detector, the smoothing circuit configured to generate the second measured peak signal by removing one or more signal infirmities from the second peak signal, the one or more signal infirmities produced by the peak detector of the second reference measurement circuit.

16. The signal processing system of claim 13, wherein the bias detection circuit comprises:
    a first differential amplifier comprising a first input coupled to an output of the first reference measurement circuit and a second input coupled to an output of the second reference measurement circuit, the first differential amplifier configured to generate a bias error signal by determining a bias error between the first measured peak signal and the second measured peak signal, the bias error corresponding to the DC component of the analog input signal;

a low-pass filter (LPF) coupled to an output of the first differential amplifier, the LPF configured to generate a modified bias error signal by removing components of the bias error signal above an LPF frequency threshold; and a buffer coupled to an output of the LPF, the buffer configured to generate the bias signal by applying a voltage gain to the bias error signal.

17. The signal processing system of claim 13, wherein the bias removal circuit comprises:

a second differential amplifier comprising a first input coupled to an output of the bias detection circuit and a second input coupled to the input transmission line, the second differential amplifier configured to generate the analog output signal by determining an output error between the bias signal and the analog input signal, the output error corresponding to the AC component of the analog input signal.

18. The signal processing system of claim 13, wherein the analog input signal is at least one of a symmetric waveform or an asymmetric waveform.

19. The signal processing system of claim 13, wherein the signal processing system is operable without:
  input from a user;
  an external clock;
  an isolator;
  an external memory;
  training or conditioning;
  introducing a phase shift between the analog input signal and the analog output signal; and
  introducing a delay between the analog input signal and the analog output signal.

20. The signal processing system of claim 13, wherein the signal processing system is configured to remove a fluctuating DC component of the analog input signal, the analog output signal corresponding to the analog input signal have the fluctuating DC component removed therefrom.

* * * * *